US012791794B2

(12) United States Patent
Sugiyama

(10) Patent No.: US 12,791,794 B2
(45) Date of Patent: Nov. 10, 2026

(54) OPTICAL DEVICE, OPTICAL RECEIVER, AND OPTICAL TRANSCEIVER

(71) Applicant: FUJITSU OPTICAL COMPONENTS LIMITED, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 286 days.

(21) Appl. No.: 18/776,536

(22) Filed: Jul. 18, 2024

(65) Prior Publication Data

US 2025/0102736 A1 Mar. 27, 2025

(30) Foreign Application Priority Data

Sep. 27, 2023 (JP) ................................ 2023-165286

(51) Int. Cl.
*G02B 6/125* (2006.01)
*G02B 6/293* (2006.01)

(52) U.S. Cl.
CPC .......... *G02B 6/2938* (2013.01); *G02B 6/125* (2013.01)

(58) Field of Classification Search
CPC .................. G02B 6/125; G02B 6/2813; G02B 2006/12135; G02B 2006/12147; G02B 2006/12159; G02F 1/0147
USPC ......................... 385/1-3, 14, 24, 42, 48, 50
See application file for complete search history.

(56) References Cited

U.S. PATENT DOCUMENTS 8,526,102 B2 * 9/2013 Inoue .................. H04B 10/613 359/325
10,126,498 B1 11/2018 Ma et al.
11,223,425 B2 * 1/2022 Oka ...................... H04B 10/60
11,307,355 B2 * 4/2022 Oka ..................... G02B 6/2813
11,327,234 B2 * 5/2022 Sobu .................... G02B 6/2813
11,740,411 B2 * 8/2023 Dong ................. G02B 6/29301 385/43
11,982,839 B2 * 5/2024 Jizodo ..................... H01P 5/227
12,101,126 B1 * 9/2024 Pathak ................. H04B 10/615
2013/0004123 A1 * 1/2013 Watanabe .............. G02B 6/125 385/146
2014/0086595 A1 * 3/2014 Yamazaki .............. G02B 6/125 156/280

FOREIGN PATENT DOCUMENTS

JP 2001-109023 4/2001
JP 2008-193555 8/2008

* cited by examiner

*Primary Examiner* — Robert Tavlykaev
(74) *Attorney, Agent, or Firm* — STAAS & HALSEY LLP

(57) ABSTRACT

A 90-degree hybrid circuit includes a first and a second waveguide in each of which signal light split by a first coupler propagates. The circuit includes a third and a fourth waveguide in each of which local oscillator light split by a second coupler propagates, and a third coupler that multiplexes the signal light propagated through the first waveguide and the local oscillator light propagated through the third waveguide. The circuit includes a fourth coupler that multiplexes the signal light propagated through the second waveguide and the local oscillator light propagated through the fourth waveguide, and a phase adjustor that adjusts a phase of light propagating through at least one waveguide from among the first to the fourth waveguides. A first total value of optical lengths of the first and the fourth waveguide is shorter than a second total value of optical lengths of the second and the third waveguide.

10 Claims, 10 Drawing Sheets

OPTICAL DEVICE, OPTICAL RECEIVER, AND OPTICAL TRANSCEIVER

CROSS-REFERENCE TO RELATED APPLICATION

This application is based upon and claims the benefit of priority of the prior Japanese Patent Application No. 2023-165286, filed on Sep. 27, 2023, the entire contents of which are incorporated herein by reference.

FIELD

The embodiments discussed herein are related to an optical device, an optical receiver, and an optical transceiver.

BACKGROUND

For example, an optical receiver that adopts a digital coherent reception function includes a 90-degree hybrid circuit, as a built-in unit, that combines signal light and local oscillator light, and that outputs the signal light by splitting the signal light into orthogonal components. FIG. 10 is an explanation diagram illustrating one example of a 90-degree hybrid circuit 100 that is conventionally used. The 90-degree hybrid circuit 100 illustrated in FIG. 10 includes a first splitter 110, a second splitter 120, a first combiner 130, a second combiner 140, and a first to a fourth waveguides 101A to 101D.

The first splitter 110 is a 2×2 coupler that includes a first input port 111A, a second input port 111B, a first output port 111C, and a second output port 111D. The second splitter 120 is a 1×2 coupler that includes a first input port 121A, a first output port 121B, and a second output port 121C.

The first combiner 130 is a 2×2 coupler that includes a first input port 131A, a second input port 131B, a first output port 131C, and a second output port 131D. The second combiner 140 is a 2×2 coupler that includes a first input port 141A, a second input port 141B, a first output port 141C, and a second output port 141D.

The first splitter 110 optically connects the first output port 111C included in the first splitter 110 and the first input port 131A included in the first combiner 130 by the first waveguide 101A. The first splitter 110 optically connects the second output port 111D included in the first splitter 110 and the first input port 141A included in the second combiner 140 by the second waveguide 101B.

The second splitter 120 optically connects the first output port 121B included in the second splitter 120 and the second input port 131B included in the first combiner 130 by the third waveguide 101C. The second splitter 120 optically connects the second output port 121C included in the second splitter 120 and the second input port 141B included in the second combiner 140 by the fourth waveguide 101D.

The first combiner 130 optically connects the first input port 131A included in the first combiner 130 and the first output port 111C included in the first splitter 110 by the first waveguide 101A. The first combiner 130 optically connects the second input port 131B included in the first combiner 130 and the first output port 121B included in the second splitter 120 by the third waveguide 101C.

The second combiner 140 optically connects the first input port 141A included in the second combiner 140 and the second output port 111D included in the first splitter 110 by the second waveguide 101B. The second combiner 140 optically connects the second input port 141B included in the second combiner 140 and the second output port 121C included in the second splitter 120 by the fourth waveguide 101D.

The first splitter 110 splits the signal light received from the first input port 111A included in the first splitter 110 into signal light of 0 degrees and signal light of 90 degrees. The first splitter 110 outputs the split signal light of 0 degrees to the first output port 111C included in the first splitter 110, and outputs the split signal light of 90 degrees to the second output port 111D included in the first splitter 110.

The second splitter 120 converts the local oscillator light received from the first input port 121A included in the second splitter 120 to the local oscillator light of 0 degrees, and outputs the local oscillator light of 0 degrees to the first output port 121B and the second output port 121C that are included in the second splitter 120.

The first combiner 130 inputs both the signal light of 0 degrees received from the first splitter 110 and the local oscillator light of 0 degrees received from the second splitter 120. The first combiner 130 outputs, on the basis of the input signal light of 0 degrees and the input local oscillator light of 0 degrees, first signal light, as a channel CH1, for multiplexing the signal light of 0 degrees and the local oscillator light of 90 degrees to the first output port 131C included in the first combiner 130. The first signal light is the signal light that has a phase difference of 0 degrees between the signal light and the local oscillator light, and that has the XIp component.

Furthermore, the first combiner 130 outputs, on the basis of the input signal light of 0 degrees and the input local oscillator light of 0 degrees, second signal light, as a channel CH2, for multiplexing the signal light of 90 degrees and the local oscillator light of 0 degrees to the second output port 131D included in the first combiner 130. The second signal light is the signal light that has a phase difference of 180 degrees between the signal light and the local oscillator light, and that has the XIn component.

The second combiner 140 inputs both the signal light of 90 degrees received from the first splitter 110 and the local oscillator light of 0 degrees received from the second splitter 120. The second combiner 140 outputs, on the basis of the input signal light of 90 degrees and the input local oscillator light of 0 degrees, third signal light, as a channel CH3, for multiplexing the signal light of 90 degrees and the local oscillator light of 90 degrees to the first output port 141C included in the second combiner 140. The third signal light is the signal light that has a phase difference of 90 degrees between the signal light and the local oscillator light, and that has the XQp component.

Furthermore, the second combiner 140 outputs, on the basis of the input signal light of 90 degrees and the input local oscillator light of 0 degrees, fourth signal light, as a channel CH4, for multiplexing the signal light of 180 degrees and the local oscillator light of 0 degrees to the second output port 141D included in the second combiner 140. The fourth signal light is the signal light that has a phase difference of 270 degrees between the signal light and the local oscillator light, and that has the XQn component.

In other words, the 90-degree hybrid circuit 100 outputs, on the basis of the input signal light and the input local oscillator light, the first to the fourth signal light each having the phase difference of 90 degrees between the signal light and the local oscillator light through the first combiner 130 and the second combiner 140.

When an optical length of the first waveguide 101A is denoted by L1, an optical length of the second waveguide 101B is denoted by L2, an optical length of the third waveguide 101C is denoted by L3, and an optical length of the fourth waveguide 101D is denoted by L4, the relationship of the optical lengths of L1=L2=L3=L4 holds. Moreover, the optical length is calculated on the basis of a formula indicated by a waveguide length of a waveguide× effective refractive index.

Patent Document 1: Japanese Laid-open Patent Publication No. 2008-193555

Patent Document 2: U.S. Pat. No. 10,126,498

Patent Document 3: Japanese Laid-open Patent Publication No. 2001-109023

The 90-degree hybrid circuit 100 accordingly outputs the first to the fourth signal light each having the phase difference of 90 degrees between the signal light and the local oscillator light. However, in the 90-degree hybrid circuit 100, for example, a manufacturing error of a waveguide width or the like occurs in the first splitter 110, the second splitter 120, the first combiner 130, the second combiner 140, or the first to the fourth waveguides 101A to 101D. Therefore, in the 90-degree hybrid circuit 100, it is not possible to ensure a phase difference of 90 degrees between the signal light and the local oscillator light caused by the manufacturing error or the like, and a signal loss occurs.

SUMMARY

According to an aspect of an embodiment, an optical device includes a 90-degree hybrid circuit that combines signal light and local oscillator light, and that outputs the signal light by splitting the signal light into orthogonal components. The 90-degree hybrid circuit includes a first coupler that splits the signal light and a second coupler that splits the local oscillator light. The 90-degree hybrid circuit includes a first waveguide, a second waveguide, a third waveguide, a fourth waveguide, a third coupler, a fourth coupler and a phase adjustor. The first waveguide and the second waveguide in each of which the signal light that has been split by the first coupler propagates. The third waveguide and the fourth waveguide in each of which the local oscillator light that has been split by the second coupler propagates. The third coupler multiplexes the signal light that has propagated through the first waveguide and the local oscillator light that has propagated through the third waveguide. The fourth coupler multiplexes the signal light that has propagated through the second waveguide and the local oscillator light that has propagated through the fourth waveguide. The phase adjustor adjusts a phase of the light propagating through at least one waveguide from among the first waveguide, the second waveguide, the third waveguide, and the fourth waveguide. The first total value of an optical length of the first waveguide and an optical length of the fourth waveguide is shorter than a second total value of an optical length of the second waveguide and an optical length of the third waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments. In addition, each of the embodiments may be used in any appropriate combination as long as they do not conflict with each other.

(a) First Embodiment

Figure 1:
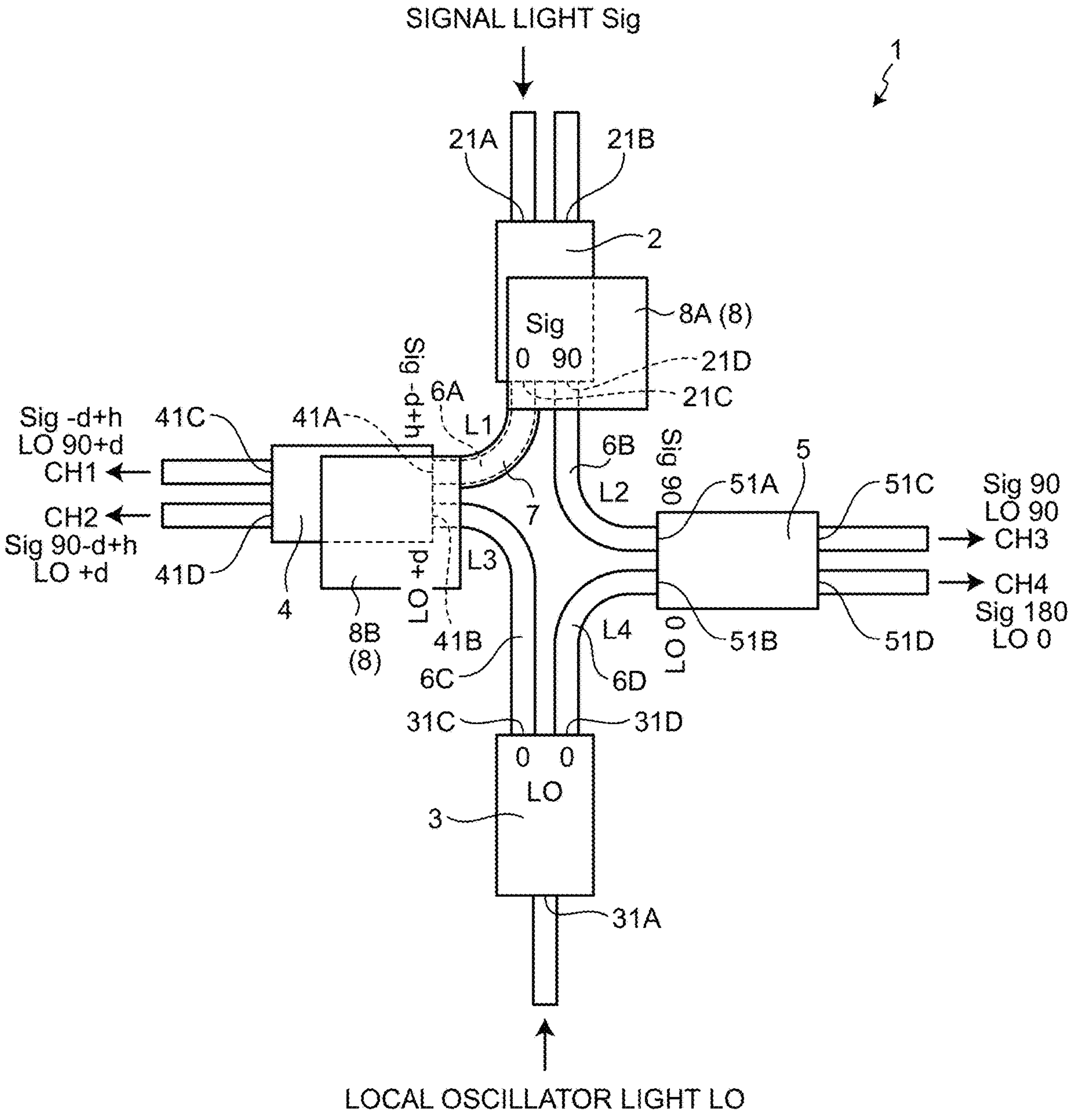
FIG. 1 is an explanation diagram illustrating one example of a 90-degree hybrid circuit according to a first embodiment.

FIG. 1 is an explanation diagram illustrating one example of a 90-degree hybrid circuit 1 according to a first embodiment. The 90-degree hybrid circuit 1 illustrated in FIG. 1 is a circuit that combines signal light and local oscillator light, and that outputs the signal light by splitting the signal light into orthogonal components. The 90-degree hybrid circuit 1 includes a first splitter 2, a second splitter 3, a first combiner 4, a second combiner 5, a first to a fourth waveguides 6A to 6D, a heater electrode 7, and two electrode pads 8.

The first splitter 2 is a 2×2 coupler that includes a first input port 21A, a second input port 21B, a first output port 21C, and a second output port 21D. The first splitter 2 is a first coupler that splits the signal light and outputs the split signal light to the first waveguide 6A and a second waveguide 6B. The second splitter 3 is a 1×2 coupler that includes a first input port 31A, a first output port 31C, and a second output port 31D. The second splitter 3 is a second coupler that splits the local oscillator light and outputs the split local oscillator light to a third waveguide 6C and a fourth waveguide 6D, and outputs the branched local oscillator light. The first combiner 4 is a 2×2 coupler that includes a first input port 41A, a second input port 41B, a first output port 41C, and a second output port 41D. The first combiner 4 is a third coupler that multiplexes the signal light that has propagated through the first waveguide 6A and the local oscillator light that has propagated through the third waveguide 6C. The second combiner 5 is a 2×2 coupler that includes a first input port 51A, a second input port 51B, a first output port 51C, and a second output port 51D. The second combiner 5 is a fourth coupler that multiplexes the signal light that has propagated through the second waveguide 6B and the local oscillator light that has propagated through the fourth waveguide 6D.

The first splitter 2 optically connects the first output port 21C included in the first splitter 2 and the first input port 41A included in the first combiner 4 by the first waveguide 6A. The first splitter 2 optically connects the second output port 21D included in the first splitter 2 and the first input port 51A included in the second combiner 5 by the second waveguide 6B.

The second splitter 3 optically connects the first output port 31C included in the second splitter 3 and the second input port 41B included in the first combiner 4 by the third waveguide 6C. The second splitter 3 optically connects the second output port 31D included in the second splitter 3 and the second input port 51B included in the second combiner 5 by the fourth waveguide 6D.

The first combiner 4 optically connects the first input port 41A included in the first combiner 4 and the first output port 21C included in the first splitter 2 by the first waveguide 6A. The first combiner 4 optically connects the second input port 41B included in the first combiner 4 and the first output port 31C included in the second splitter 3 by the third waveguide 6C.

The second combiner 5 optically connects the first input port 51A included in the second combiner 5 and the second output port 21D included in the first splitter 2 by the second waveguide 6B. The second combiner 5 optically connects the second input port 51B included in the second combiner 5 and the second output port 31D included in the second splitter 3 by the fourth waveguide 6D.

When an optical length of the first waveguide 6A is denoted by L1, an optical length of the second waveguide 6B is denoted by L2, an optical length of the third waveguide 6C is denoted by L3, and an optical length of the fourth waveguide 6D is denoted by L4, the relationship of the optical lengths among the first to the fourth waveguides 6A to 6D is represented by $L1+L4<L2+L3$. Furthermore, the optical length is calculated on the basis of a formula indicated by a waveguide length of a waveguide×effective refractive index. The optical length L1 of the first waveguide 6A is made shorter than the optical length L2 of the second waveguide 6B. Therefore, the 90-degree hybrid circuit 1 is constituted such that, for example, the signal light received from the first output port 21C included in the first splitter 2 becomes (0−d) degrees and the signal light received from the second output port 21D included in the first splitter 2 becomes 90 degrees. The first splitter 2 is constituted such that, by adjusting and setting the optical length of each of the first waveguide 6A and the second waveguide 6B in advance, for example, an error of 10 degrees occurs, that is, a phase difference of 80 degrees is generated, as a phase difference of the signal light with respect to the local oscillator light.

The heater electrode 7 is a phase adjustment portion that is arranged on the first waveguide 6A, and that adjusts the phase of the signal light propagating through the first waveguide 6A. Moreover, the heater electrode 7 is constituted by an electrode material including, for example, Ti, TiN, or the like. The electrode pad 8 that is electrically connected to the heater electrode 7 includes a first electrode pad 8A that is arranged in the vicinity of the first splitter 2 and a second electrode pad 8B that is arranged in the vicinity of the first combiner 4. The heater electrode 7 heats the first waveguide 6A as a result of an electric current flowing through a path between the first electrode pad 8A and the second electrode pad 8B. In the first waveguide 6A, the refractive index is changed in accordance with the thermo-optical effect of the first waveguide 6A, and the phase angle of the signal light propagating through the first waveguide 6A becomes high.

In addition, the optical length L1 of the first waveguide 6A is different from the optical length L3 of the third waveguide 6C, so that the signal light that is input to the first input port 41A included in the first combiner 4 becomes Sig−d, and the local oscillator light that inputs to the second input port 41B included in the first combiner 4 becomes Lo+d, where "d" denotes a change in the phase angle caused by a difference in the optical length. "d" is set such that, in order to adjust the phase angle of the signal light by driving the heater electrode 7 arranged in the vicinity of the first waveguide 6A, the phase angle of the signal light with respect to the local oscillator light is set to less than −90 degrees at the channel CH1, and set to less than +90 degrees at the channel CH2 in the state in which the heater electrode 7 is not driven.

The first splitter 2 splits the signal light received from the first input port 21A included in the first splitter 2 into the signal light of 0 degrees and the signal light of 90 degrees. The first splitter 2 outputs the split signal light of 0 degrees to the first waveguide 6A that is connected to the first output port 21C included in the first splitter 2, and also outputs the split signal light of 90 degrees to the second waveguide 6B that is connected to the second output port 21D included in the first splitter 2.

The second splitter 3 splits the local oscillator light received from the first input port 31A included in the second splitter 3, and outputs the split local oscillator light, as the local oscillator light of 0 degrees, to the third waveguide 6C that is connected to the first output port 31C and the fourth waveguide 6D that is connected to the second output port 31D.

The first combiner 4 inputs both the signal light Sig-d+h of 0 degrees received from the first waveguide 6A and the local oscillator light LO+d of 0 degrees received from the third waveguide 6C. The first combiner 4 outputs, on the basis of the input signal light and the input local oscillator light, the first signal light, as the channel CH1, obtained by multiplexing the signal light Sig-d+h and the local oscillator light LO+90+d to the first output port 41C included in the first combiner 4. The first signal light is the signal light that has a phase difference of 0 degrees between the signal light and the local oscillator light, and that has a XIp component corresponding to the I component of X-polarized waves.

Furthermore, the first combiner 4 outputs, on the basis of the input signal light of 0 degrees and the input local oscillator light of 0 degrees, the second signal light, as the channel CH2, obtained by multiplexing the signal light Sig+90−d+h of 90 degrees the local oscillator light LO+d of 0 degrees to the second output port 41D included in the first combiner 4. The second signal light is the signal light that has a phase difference of 180 degrees between the signal light and the local oscillator light, and that has a XIn component corresponding to the I component of X-polarized waves.

The second combiner 5 inputs both the signal light Sig+90 of 90 degrees received from the first splitter 2 and the local oscillator light LO+0 of 0 degrees received from the second splitter 3. The second combiner 5 outputs, on the basis of the input signal light of 90 degrees and the local oscillator light of 0 degrees, the third signal light, as the channel CH3, obtained by multiplexing the signal light Sig+90 of 90 degrees and the local oscillator light LO+90 of 90 degrees to the first output port 51C included in the second combiner 5. The third signal light is the signal light that has a phase difference of 90 degrees between the signal light and the local oscillator light, and that has a XQp component corresponding to the Q component of X-polarized waves.

Furthermore, the second combiner 5 outputs, on the basis of the input signal light of 90 degrees and the input local oscillator light of 0 degrees, the fourth signal light, as the channel CH4, obtained by multiplexing signal light Sig+180 of 180 degrees and the local oscillator light LO+0 of 0 degrees to the second output port 51D included in the second combiner 5. The fourth signal light is the signal light that has a phase difference of 270 degrees between the signal light and the local oscillator light, and that has a XQn component corresponding to the Q component of X-polarized waves.

The heater electrode 7 arranged on the first waveguide 6A heats the first waveguide 6A as a result of an electric current flowing through a path between the first electrode pad 8A and the second electrode pad 8B. In the first waveguide 6A, the refractive index is changed in accordance with the thermo-optical effect of the first waveguide 6A, and the phase angle of the signal light propagating through the first waveguide 6A becomes high. The heater electrode 7 adjusts the signal light Sig−d that enters the first combiner 4 by a phase change h that is indicated when the first waveguide 6A is heated. As a result of this, the 90-degree hybrid circuit 1 accordingly adjusts the signal light Sig-d+h that enters the first combiner 4 such that the phase difference at the channel CH1 becomes 0 degrees and the phase difference at the channel CH2 becomes 180 degrees.

In the case where the relationship of the optical length among the first to the fourth waveguides 6A to 6D is L1+L4<L2+L3, the phase difference at the channel CH1 is less than −90 degrees. If an electric current flows into the heater electrode 7 in this state, the phase difference becomes large, so that it is possible to allow the phase difference at the channel CH1 to be −90 degrees by adjusting the value of the electric current. In contrast, in the case where the relationship of the optical length among the first to the fourth waveguides 6A to 6D is L1+L4>L2+L3, the phase difference at the channel CH1 ends up being equal to or larger than −90 degrees. Even if an electric current flows into the heater electrode 7 in this state, the phase difference simply becomes large, so that it is not possible to allow the phase difference at the channel CH1 to be −90 degrees.

For example, in the case where a change in the phase angle caused by a manufacturing error is denoted by "e", "d=d-e" holds. In a case of e<d, it is possible to allow the phase angle to become an expected phase angle difference (90 degrees) by heating the heater electrode 7. However, in a case of e≥d, the phase difference of the signal light with respect to the local oscillator light at the channel CH2 becomes 90 degrees−2(d-e)>90 degrees in a state in which the heater electrode 7 is not heated (h=0), so that, if the heater electrode 7 is heated, the result consequently becomes equal to or larger than 90 degrees. Therefore, in this case, it is not possible to perform adjustment by using the heater electrode 7.

Therefore, in order to adjust the phase difference at the channel CH1 to −90 degrees by the heater electrode 7 including an error in the initial phase difference caused by the manufacturing error, the relationship of the optical lengths among the first to the fourth waveguides 6A to 6D needs to be adjusted to the relationship indicated by L1+L4<L2+L3.

In other words, even in the case where a phase error of d-e occurs between the signal light and the local oscillator light that enters the first combiner 4 caused by the manufacturing error, the refractive index of the first waveguide 6A is increased by allowing an electric current to flow into the heater electrode 7 and heating the first waveguide 6A. As a result of this, it is possible to adjust the phase difference between the signal light propagating through the first waveguide 6A and the signal light propagating through the second waveguide 6B to 90 degrees.

The 90-degree hybrid circuit 1 according to the first embodiment allows the relationship of the optical lengths among the first to the fourth waveguides 6A to 6D to be the relationship that is indicated by L1+L4<L2+L3 and that is set in advance. Furthermore, even in the case where the phase error of d-e occurs between the signal light and the local oscillator light entering the first combiner 4 caused by the manufacturing error, the 90-degree hybrid circuit 1 increases the refractive index of the first waveguide 6A by allowing an electric current to flow into the heater electrode 7 and heating the first waveguide 6A. Then, the 90-degree hybrid circuit 1 adjusts, by increasing the refractive index of the first waveguide 6A, the phase difference between the signal light propagating through the first waveguide 6A and the signal light propagating through the second waveguide 6B to 90 degrees. As a result of this, even in the case where a manufacturing error occurs, it is possible to suppress a signal loss by stably ensuring the phase difference of 90 degrees.

Moreover, a case has been described as an example in which the optical length is adjusted by adjusting the waveguide length of each of the first to the fourth waveguides 6A to 6D according to the first embodiment, but an embodiment is not limited to this. The optical length may be adjusted by adjusting the waveguide width, and appropriate modifications are possible. In this case, the same effect can be obtained by making the waveguide width of the first waveguide 6A narrower than the waveguide width of the second waveguide 6B and making the waveguide width of the fourth waveguide 6D narrower than the waveguide width of the third waveguide 6C.

Furthermore, a case has been described as an example in which the 90-degree hybrid circuit 1 according to the first embodiment is constituted to have a structure in which the optical length L1 of the first waveguide 6A is made narrower than the optical length L4 of the fourth waveguide 6D. However, the embodiment is not limited to this, and an embodiment thereof will be described as a second embodiment.

(b) Second Embodiment

Figure 2:
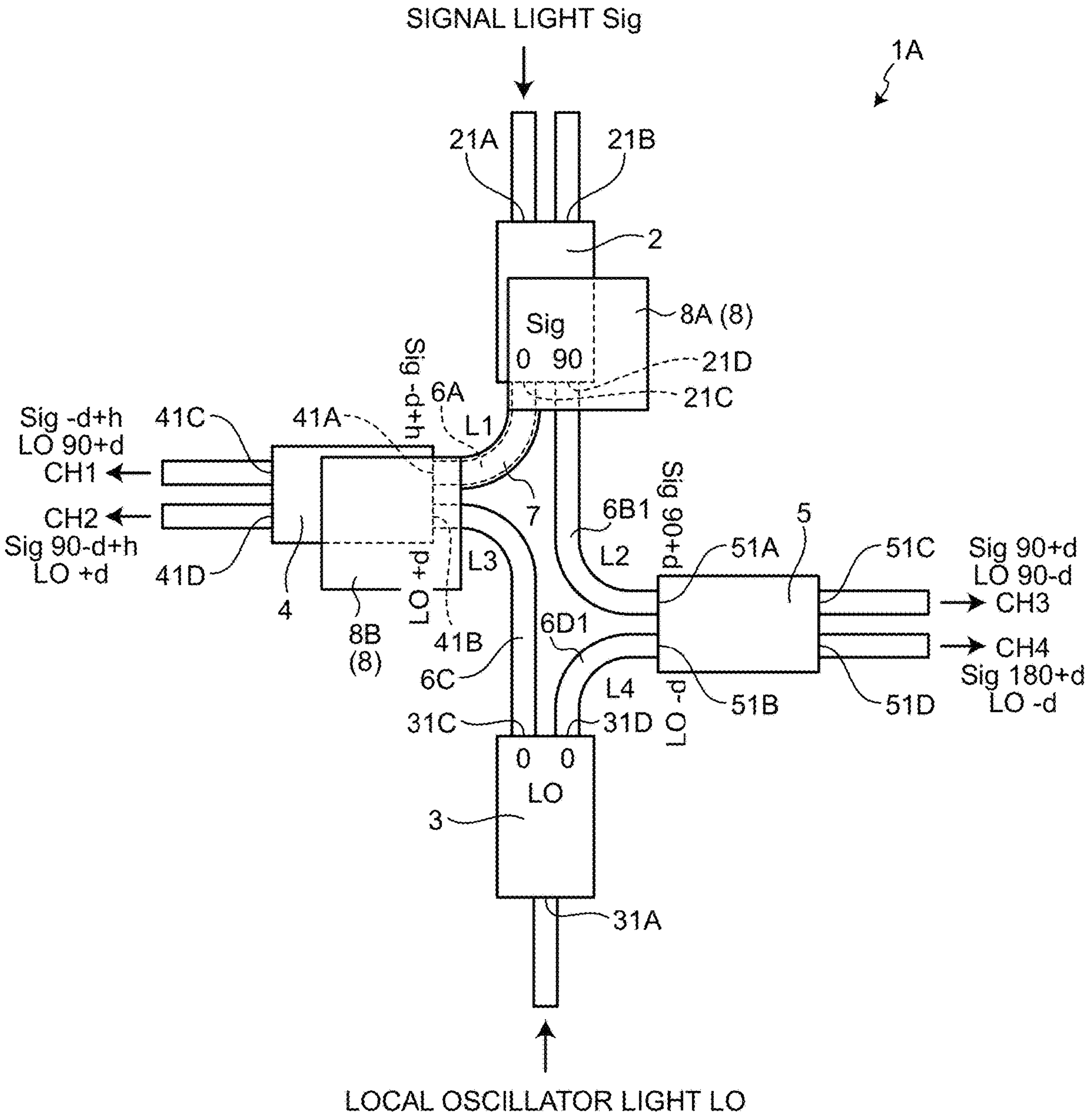
FIG. 2 is an explanation diagram illustrating one example of a 90-degree hybrid circuit according to a second embodiment.

FIG. 2 is an explanation diagram illustrating one example of a 90-degree hybrid circuit 1A according to the second embodiment. In addition, by assigning the same reference numerals to components having the same configuration as those in the 90-degree hybrid circuit 1 according to the first embodiment, overlapped descriptions of the configuration and the operation thereof will be omitted. The 90-degree hybrid circuit 1A according to the second embodiment is different from the 90-degree hybrid circuit 1 according to the first embodiment in that the relationship of the optical lengths among the first to the fourth waveguides 6A, 6B1, 6C, and 6D1 is the relationship indicated by L1=L4<L2=L3. The structure of the 90-degree hybrid circuit 1A is constituted to have a structure in which the optical length L1 of the first waveguide 6A and the optical length L4 of the fourth waveguide 6D1 are the same and the optical length L2 of the second waveguide 6B1 and the optical length L3 of the third waveguide 6C are the same.

The first splitter 2 splits the signal light received from the first input port 21A included in the first splitter 2 into the signal light of 0 degrees and the signal light of 90 degrees. The first splitter 2 outputs the split signal light of 0 degrees to the first waveguide 6A that is connected to the first output port 21C included in the first splitter 2, and also outputs the split signal light of 90 degrees to the second waveguide 6B1 that is connected to the second output port 21D included in the first splitter 2.

The second splitter 3 splits the local oscillator light received from the first input port 31A included in the second splitter 3, and outputs the split local oscillator light, as the local oscillator light of 0 degrees, to the third waveguide 6C that is connected to the first output port 31C and the fourth waveguide 6D1 that is connected to the second output port 31D.

The first combiner 4 inputs both the signal light Sig-d+h of 0 degrees received from the first waveguide 6A and the local oscillator light LO+d of 0 degrees received from the third waveguide 6C. The first combiner 4 outputs, on the basis of the input signal light and the input local oscillator light, the first signal light, as the channel CH1, obtained by multiplexing the signal light Sig-d+h and the local oscillator light LO+90+d to the first output port 41C included in the first combiner 4. The first signal light is the signal light that has a phase difference of 0 degrees between the signal light and the local oscillator light, and that has the XIp component.

Furthermore, the first combiner 4 outputs, on the basis of the input signal light of 0 degrees and the input local oscillator light of 0 degrees, the second signal light, as the channel CH2, obtained by multiplexing the signal light Sig+90−d+h of 90 degrees and the local oscillator light LO+d of 0 degrees to the second output port 41D included in the first combiner 4. The second signal light is the signal light that has a phase difference of 180 degrees between the signal light and the local oscillator light, and that has the XIn component.

The second combiner 5 inputs both the signal light Sig+90+d of 90 degrees received from the first splitter 2 and the local oscillator light LO−d of 0 degrees received from the second splitter 3. The second combiner 5 outputs, on the basis of the input signal light of 90 degrees and the input local oscillator light of 0 degrees, the third signal light, as the channel CH3, obtained by multiplexing the signal light Sig+90+d of 90 degrees and the local oscillator light LO+90−d of 90 degrees to the first output port 51C included in the second combiner 5. The third signal light is the signal light that has a phase difference of 90 degrees between the signal light and the local oscillator light, and that has the XQp component.

Furthermore, the second combiner 5 outputs, on the basis of the input signal light of 90 degrees and the input local oscillator light of 0 degrees, the fourth signal light, as the channel CH4, obtained by multiplexing the signal light Sig+180+d of 180 degrees and the local oscillator light LO−d of 0 degrees to the second output port 51D included in the second combiner 5. The fourth signal light is the signal light that has a phase difference of 270 degrees between the signal light and the local oscillator light, and that has the XQn component.

The heater electrode 7 arranged on the first waveguide 6A heats the first waveguide 6A as a result of an electric current flowing through a path between the first electrode pad 8A and the second electrode pad 8B. In the first waveguide 6A, the refractive index is changed in accordance with the thermo-optical effect of the first waveguide 6A, and the phase angle of the signal light propagating through the first waveguide 6A becomes high. Then, the heater electrode 7 adjusts the signal light Sig-d that enters the first combiner 4 by the phase change h that is indicated when the first waveguide 6A is heated. As a result of this, the 90-degree hybrid circuit 1A accordingly adjusts the signal light Sig-d+h that enters the first combiner 4 such that the phase difference at the channel CH1 becomes 0 degrees and the phase difference at the channel CH2 becomes 180 degrees.

In the 90-degree hybrid circuit 1A according to the second embodiment, the relationship of the optical length among the first to the fourth waveguides 6A to 6D is set to the relationship indicated by L1=L4<L2=L3, the configuration of the first waveguide 6A and the configuration of the fourth waveguide 6D1 are symmetric with respect to a point, and the configuration of the second waveguide 6B1 and the configuration of the third waveguide 6C are symmetric with respect to a point. As a result of this, it is possible to suppress a variation in a phase difference as a result of the effect of a process error being canceled.

However, in the 90-degree hybrid circuit 1 (1A) according to the first and the second embodiments, the heater electrode 7 is arranged on the first waveguide 6, so that it is conceivable that the life of the heater electrode 7 is reduced due to concentrated heating of the first waveguide 6A. Accordingly, an embodiment of solving this circumstance will be described below as a 90-degree hybrid circuit 1B according to a third embodiment.

(c) Third Embodiment

Figure 3:
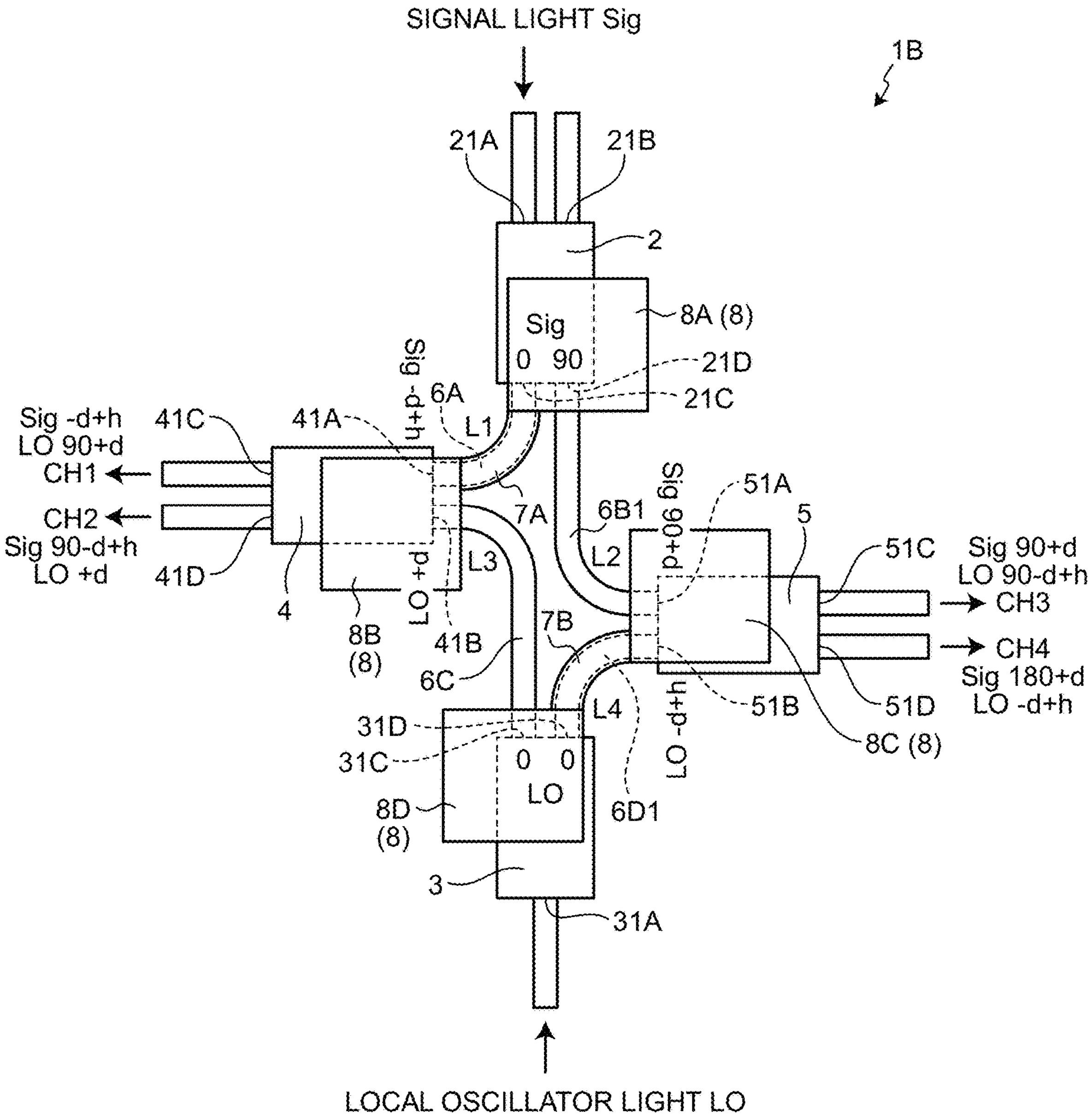
FIG. 3 is an explanation diagram illustrating one example of a 90-degree hybrid circuit according to a third embodiment.

FIG. 3 is an explanation diagram illustrating one example of the 90-degree hybrid circuit 1B according to the third embodiment. The 90-degree hybrid circuit 1B according to the third embodiment is different from the 90-degree hybrid circuit 1A according to the second embodiment in that a first heater electrode 7A is arranged on the first waveguide 6A, and a second heater electrode 7B is arranged on the fourth waveguide 6D1.

The first heater electrode 7A is arranged on the first waveguide 6A. The electrode pad 8 that is electrically connected to the first heater electrode 7A includes the first electrode pad 8A that is arranged in the vicinity of the first splitter 2, and the second electrode pad 8B that is arranged in the vicinity of the first combiner 4. The first heater electrode 7A heats the first waveguide 6A as a result of an electric current flowing through a path between the first electrode pad 8A and the second electrode pad 8B. In the first waveguide 6A, the refractive index is changed in accordance with the thermo-optical effect of the first waveguide 6A, and the phase angle of the signal light propagating through the first waveguide 6A becomes high.

The second heater electrode 7B is arranged on the fourth waveguide 6D1. The electrode pad 8 that is electrically connected to the second heater electrode 7B includes a third electrode pad 8C that is arranged in the vicinity of the second splitter 3, and a fourth electrode pad 8D that is arranged in the vicinity of the second combiner 5. The second heater electrode 7B heats the fourth waveguide 6D1 as a result of an electric current flowing through a path between the third electrode pad 8C and the fourth electrode pad 8D. In the fourth waveguide 6D1, the refractive index is changed in accordance with the thermo-optical effect of the fourth waveguide 6D1, and the phase angle of the signal light propagating through the fourth waveguide 6D1 becomes high.

The first splitter 2 splits signal light received from the first input port 21A included in the first splitter 2 into the signal light of 0 degrees and the signal light of 90 degrees. The first splitter 2 outputs the split signal light of 0 degrees to the first waveguide 6A that is connected to the first output port 21C included in the first splitter 2, and also outputs the split signal light of 90 degrees to the second waveguide 6B1 that is connected to the second output port 21D included in the first splitter 2. The second splitter 3 splits the local oscillator light received from the first input port 31A included in the second splitter 3, and outputs the split local oscillator light, as the local oscillator light of 0 degrees, to the third waveguide 6C that is connected to the first output port 31C and the fourth waveguide 6D1 that is connected to the second output port 31D.

The first combiner 4 inputs the signal light Sig−d+h of 0 degrees received from the first waveguide 6A and the local oscillator light LO+d of 0 degrees received from the third waveguide 6C. The first combiner 4 outputs, on the basis of the input signal light and the input local oscillator light, the first signal light, as the channel CH1, obtained by multiplexing the signal light Sig-d+h and the local oscillator light LO+90+d to the first output port 41C included in the first combiner 4. The first signal light is the signal light that has a phase difference of 0 degrees between the signal light and the local oscillator light, and that has the XIp component.

Furthermore, the first combiner 4 outputs, on the basis of the input signal light of 0 degrees and the input local oscillator light of 0 degrees, the second signal light, as the channel CH2, obtained by multiplexing the signal light Sig+90−d+h of 90 degrees and the local oscillator light LO+d of 0 degrees to the second output port 41D included in the first combiner 4. The second signal light is the signal light that has a phase difference of 180 degrees between the signal light and the local oscillator light, and that has the XIn component.

The second combiner 5 inputs the signal light Sig+90+d of 90 degrees received from the first splitter 2 and the local oscillator light LO-d+h of 0 degrees received from the second splitter 3. The second combiner 5 outputs, on the basis of the input signal light of 90 degrees and the input local oscillator light of 0 degrees, the third signal light, as the channel CH3, obtained by multiplexing the signal light Sig+90+d of 90 degrees and the local oscillator light LO+90−d of 90 degrees to the first output port 51C included in the second combiner 5. The third signal light is the signal light that has a phase difference of 90 degrees between the signal light and the local oscillator light, and that has the XQp component.

The second combiner 5 outputs, on the basis of the input signal light of 90 degrees and the local oscillator light of 0 degrees, the fourth signal light, as the channel CH4, obtained by multiplexing the signal light Sig+180+d of 180 degrees and local oscillator light LO-d+h of 0 degrees to the second output port 51D included in the second combiner 5. The fourth signal light is the signal light that has a phase difference of 270 degrees between the signal light and the local oscillator light, and that has the XQn component.

The first heater electrode 7A that is arranged on the first waveguide 6 heats the first waveguide 6A as a result of an electric current flowing through a path between the first electrode pad 8A and the second electrode pad 8B. In the first waveguide 6A, the refractive index is changed in accordance with the thermo-optical effect of the first waveguide 6A, and the phase angle of the signal light propagating through the first waveguide 6A becomes high. The first heater electrode 7A adjusts the signal light Sig−d that enters the first combiner 4 by the phase change h that is indicated when the first waveguide 6A is heated. As a result of this, the 90-degree hybrid circuit 1B adjusts the signal light Sig-d+h that enters the first combiner 4 such that the phase difference at the channel CH1 becomes 0 degrees and the phase difference at the channel CH2 becomes 180 degrees.

The second heater electrode 7B that is arranged on the fourth waveguide 6D1 heats the fourth waveguide 6D1 as a result of an electric current flowing through a path between the third electrode pad 8C and the fourth electrode pad 8D. In the fourth waveguide 6D1, the refractive index is changed in accordance with the thermo-optical effect of the fourth waveguide 6D1, and the phase angle of the signal light propagating through the fourth waveguide 6D1 becomes high. The second heater electrode 7B adjusts the local oscillator light LO−d that enters the second combiner 5 by the phase change h that is indicated when the fourth waveguide 6D1 is heated. As a result of this, the 90-degree hybrid circuit 1B adjusts the local oscillator light LO-d+h that enters the second combiner 5 such that the phase difference at the channel CH3 becomes 90 degrees and the phase difference at the channel CH4 becomes 270 degrees.

The 90-degree hybrid circuit 1B according to the third embodiment adjusts the phase angle of the signal light by using the first heater electrode 7A that is arranged on the first waveguide 6A, and also adjusts the phase angle of the local oscillator light by the second heater electrode 7B that is arranged on the fourth waveguide 6D1, so that it is possible to adjust the phase difference between the signal light and the local oscillator light to 90 degrees. For example, the phase of the signal light and the phase of the local oscillator light at the input time are not always the same, and vary from hour to hour. The 90-degree hybrid circuit 1B is able to adjust, by adjusting the phase difference between the signal light and the local oscillator light to 90 degrees at a specific channel, such that the phase of the signal light with respect to the local oscillator light is different by 90 degrees between the channels, for example, between the channel CH1 and the channel CH3. In addition, for example, even in the case where overall adjustment of 10 degrees is performed, it is possible to partially charge driving adjustment of the heater electrode by performing adjustment of 5 degrees at the first heater electrode 7A and by performing adjustment of 5 degrees at the second heater electrode 7B.

In the 90-degree hybrid circuit 1B, the first heater electrode 7A is arranged on the first waveguide 6A and the second heater electrode 7B is arranged on the fourth waveguide 6D1, so that it is possible to extend the length of the life of the heater electrode by distributing an increase in temperature caused by concentrated heating.

Moreover, in the 90-degree hybrid circuit 1B according to the third embodiment, a case has been described as an example in which the two electrode pads 8 that are electrically connected to the first heater electrode 7A and the two electrode pads 8 that are electrically connected to the second heater electrode 7B. However, the embodiment is not limited to this, and an embodiment thereof will be described below as a fourth embodiment.

(d) Fourth Embodiment

Figure 4:
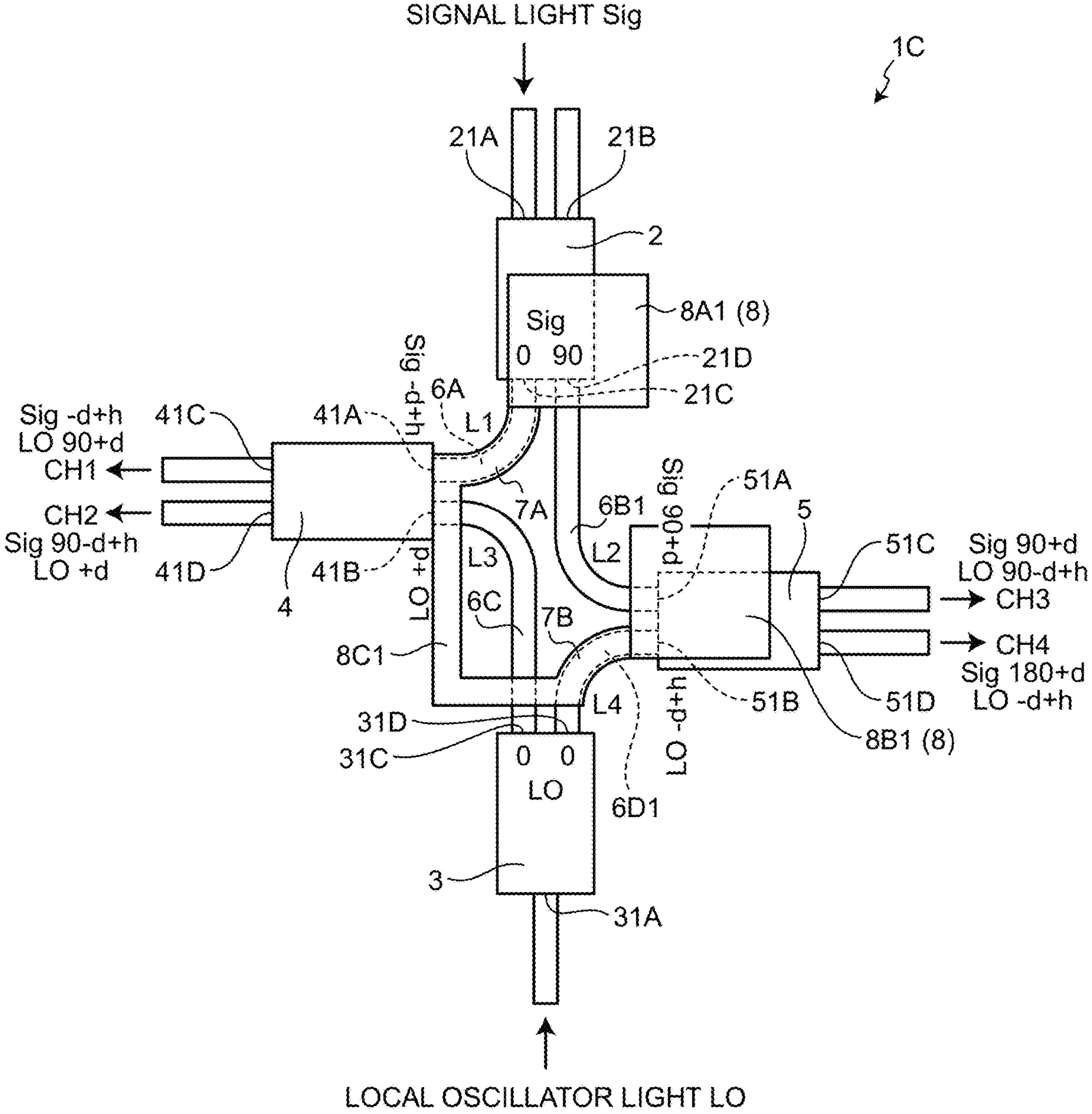
FIG. 4 is an explanation diagram illustrating one example of a 90-degree hybrid circuit according to a fourth embodiment.

FIG. 4 is an explanation diagram illustrating one example of a 90-degree hybrid circuit 1C according to the fourth embodiment. In addition, by assigning the same reference numerals to components having the same configuration as those in the 90-degree hybrid circuit 1B according to the third embodiment, overlapped descriptions of the configuration and the operation thereof will be omitted. The 90-degree hybrid circuit 1C according to the fourth embodiment is different from the 90-degree hybrid circuit 1B according to the third embodiment in that, by electrically connecting the first heater electrode 7A and the second heater electrode 7B, a driving electric current to the first heater electrode 7A and the second heater electrode 7B is shared.

The 90-degree hybrid circuit 1C includes a first electrode pad 8A1 that is arranged in the vicinity of the first splitter 2, a second electrode pad 8B1 that is arranged in the vicinity of the second combiner 5, and wiring 8C1. The first electrode pad 8A1 is electrically connected to one end of the first heater electrode 7A that is arranged on the first waveguide 6A. The second electrode pad 8B1 is electrically connected to one end of the second heater electrode 7B that is arranged on the fourth waveguide 6D1.

The wiring 8C1 electrically connects the other end of the first heater electrode 7A and the other end of the second heater electrode 7B. The wiring 8C1 connects, by way of a via (not illustrated), a portion between the first heater electrode 7A and the wiring 8C1 such that the third waveguide 6C is not heated, and also connects, by way of a via, the second heater electrode 7B and the wiring 8C1. Moreover, the via extends in a vertical direction on the drawing illustrated in FIG. 4, so that both the first heater electrode 7A (the second heater electrode 7B) and the wiring 8C1 are arranged in different layers. As a result of this, it is possible to reduce the heat affected to the wiring 8C1 drawing toward the third waveguide 6C. The wiring 8C1 is wiring having resistance lower than that of, for example, the first heater electrode 7A and the second heater electrode 7B and is, for example, aluminum wiring. Furthermore, the material of the wiring 8C1 is not limited to aluminum, and appropriate modifications are possible.

The 90-degree hybrid circuit 1C according to the fourth embodiment electrically connects the first heater electrode 7A and the second heater electrode 7B by the wiring 8C1. As a result of this, it is possible to implement driving of the first heater electrode 7A and the second heater electrode 7B in accordance with an electric current flowing through a path between the first electrode pad 8A1 and the second electrode pad 8B1.

In addition, in the 90-degree hybrid circuit 1C according to the fourth embodiment, it is conceivable that driving electrical power is increased as a result of heat being generated at the wiring 8C1 that connects the first heater electrode 7A and the second heater electrode 7B. Accordingly, an embodiment of solving this circumstance will be described below as a fifth embodiment.

(e) Fifth Embodiment

Figure 5:
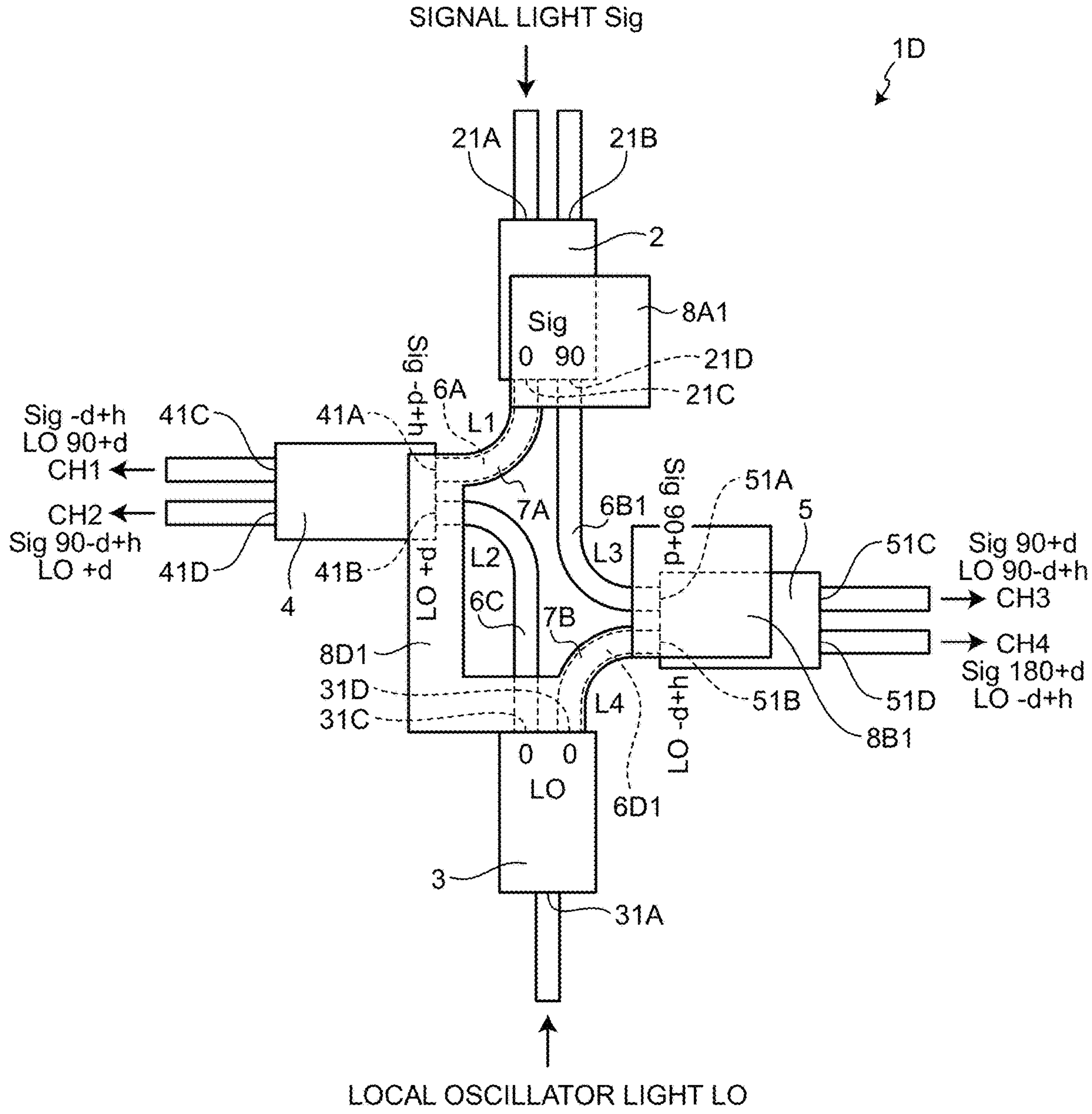
FIG. 5 is an explanation diagram illustrating one example of a 90-degree hybrid circuit according to a fifth embodiment.

FIG. 5 is an explanation diagram illustrating one example of a 90-degree hybrid circuit 1D according to the fifth embodiment. In addition, by assigning the same reference numerals to components having the same configuration as those in the 90-degree hybrid circuit 1C according to the fourth embodiment, overlapped descriptions of the configuration and the operation thereof will be omitted. The 90-degree hybrid circuit 1D according to the fifth embodiment is different from the 90-degree hybrid circuit 1C according to the fourth embodiment in that the wiring width of wiring 8D1 that electrically connects the first heater electrode 7A and the second heater electrode 7B is made wider than the wiring width of the wiring 8C1 illustrated in FIG. 4.

The 90-degree hybrid circuit 1D according to the fifth embodiment is constituted to have a structure in which the wiring width of the wiring 8D1 is made wider than the wiring width of the wiring 8C1 illustrated in FIG. 4, so that it is possible to suppress driving electrical power needed to drive the first heater electrode 7A and the second heater electrode 7B by reducing an electricity resistance.

In the 90-degree hybrid circuit 1D according to the fifth embodiment, an interval between the first waveguide 6A and the second waveguide 6B is narrow, so that it is conceivable that the effect of the phase adjustment is decreased as a result of the heat generated in the first heater electrode 7A arranged on the first waveguide 6A affecting the second waveguide 6B. Accordingly, an embodiment of solving this circumstance will be described below as a sixth embodiment.

(f) Sixth Embodiment

Figure 6:
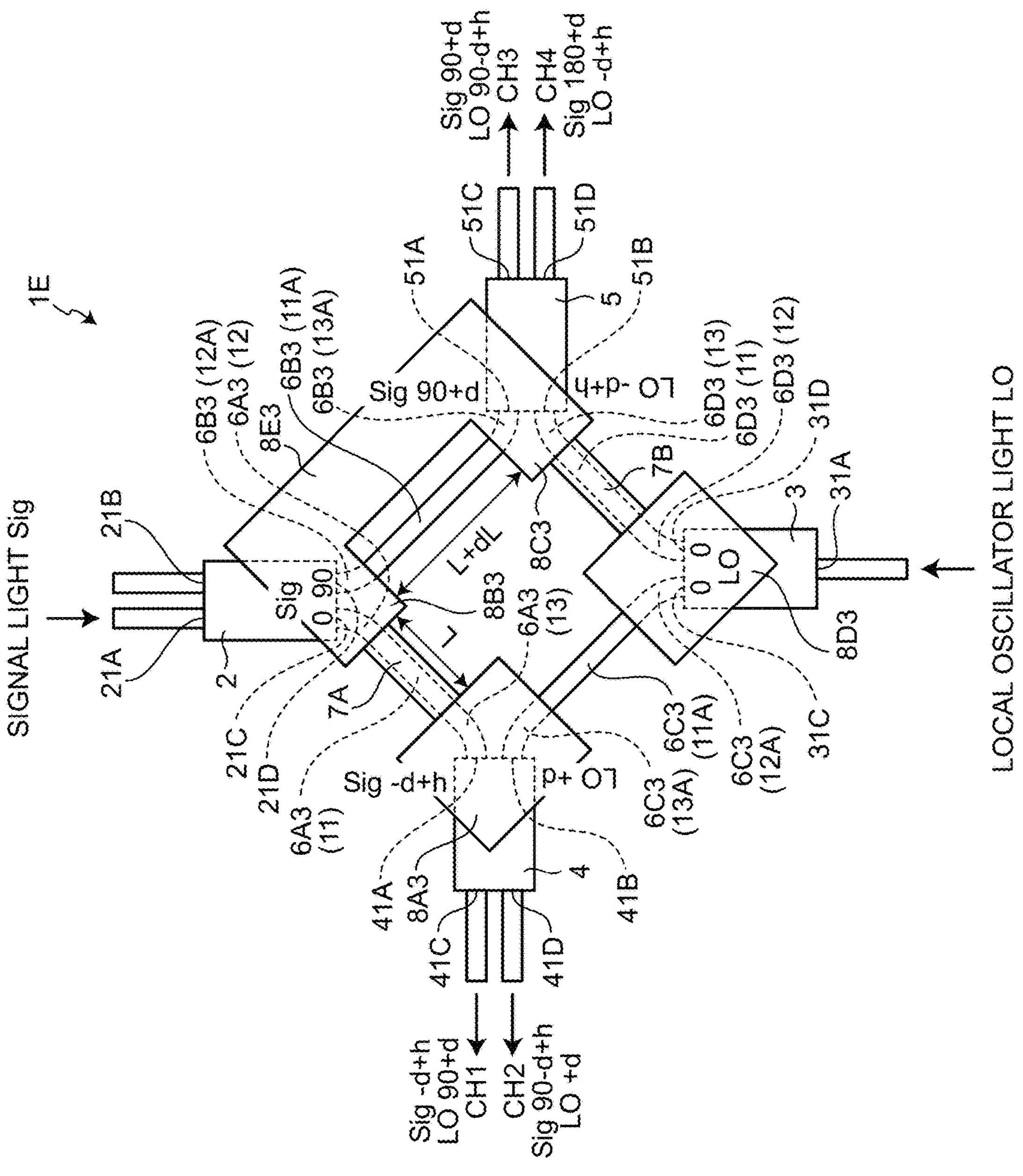
FIG. 6 is an explanation diagram illustrating one example of a 90-degree hybrid circuit according to a sixth embodiment.

FIG. 6 is an explanation diagram illustrating one example of a 90-degree hybrid circuit 1E according to the sixth embodiment. In addition, by assigning the same reference numerals to components having the same configuration as those in the 90-degree hybrid circuit 1D according to the fifth embodiment, overlapped descriptions of the configuration and the operation thereof will be omitted. The 90-degree hybrid circuit 1E according to the sixth embodiment is different from the 90-degree hybrid circuit 1D of the fifth embodiment in that an interval between a first waveguide 6A3 and a second waveguide 6B3 and an interval between a third waveguide 6C3 and a fourth waveguide 6D3 are made wider.

The first splitter 2 optically connects the first output port 21C included in the first splitter 2 and the first input port 41A included in the first combiner 4 by the first waveguide 6A3. The first waveguide 6A3 includes a first input section 12, a first output section 13, and a first straight line waveguide 11 that connects the first input section 12 and the first output section 13. The optical length of the first waveguide 6A3 is set to L.

The first splitter 2 optically connects the second output port 21D included in the first splitter 2 and the first input port 51A included in the second combiner 5 by the second waveguide 6B3. The second waveguide 6B3 includes a second input section 12A, a second output section 13A, and a second straight line waveguide 11A that connects the second input section 12A and the second output section 13A. The optical length of the second waveguide 6B3 is set to L+dL. Moreover, the optical length dL accordingly generates the signal light of Sig−d and the signal light of Sig+90+d, that is, generates "d".

In the 90-degree hybrid circuit 1E, a propagation direction of the signal light at the first input section 12 that is a connecting portion of the first waveguide 6A3 that is connected to the first splitter 2 is different from a propagation direction of the signal light at the second input section 12A that is a connecting portion of the second waveguide 6B3 that is connected to the first splitter 2. As a result of this, the 90-degree hybrid circuit 1E is constituted to have a structure in which an interval between the first waveguide 6A3 and the second waveguide 6B3 is made wider. The 90-degree hybrid circuit 1E is constituted to have a structure in which an interval between the first waveguide 6A3 and the second waveguide 6B3 are made wider as the first waveguide 6A3 and the second waveguide 6B3 are away from the first input section 12 and the second input section 12A, respectively.

The second splitter 3 optically connects the first output port 31C included in the second splitter 3 and the second input port 41B included in the first combiner 4 by the third waveguide 6C3. The third waveguide 6C3 includes the second input section 12A, the second output section 13A, and the second straight line waveguide 11A that connects the second input section 12A and the second output section 13A. The optical length of the third waveguide 6C3 is set to L+dL. Moreover, the optical length dL accordingly generates the local oscillator light of LO+d and the local oscillator light of LO-d, that is, generates "d".

The second splitter 3 optically connects the second output port 31D included in the second splitter 3 and the second input port 51B included in the second combiner 5 by the fourth waveguide 6D3. The fourth waveguide 6D3 includes the first input section 12, the first output section 13, and the first straight line waveguide 11 that connects the first input section 12 and the first output section 13. The optical length of the fourth waveguide 6D3 is set to L.

In the 90-degree hybrid circuit 1E, a propagation direction of the signal light at the first input section 12 that is a connecting portion of the fourth waveguide 6D3 that is connected to the second splitter 3 is different from a propagation direction of the signal light of the second input section 12A that is a connecting portion of the third waveguide 6C3 that is connected to the second splitter 3. As a result of this, the 90-degree hybrid circuit 1E is constituted to have a structure in which an interval between the third waveguide 6C3 and the fourth waveguide 6D3 is made wide.

In the case where the optical length of the first waveguide 6A3 is denoted by L1, the optical length of the second waveguide 6B3 is denoted by L2, the optical length of the third waveguide 6C3 is denoted by L3, and the optical length of the fourth waveguide 6D3 is denoted by L4, the relationship of the optical length among the first to the fourth waveguides 6A3 to 6D3 is L1+L4<L2+L3.

The first heater electrode 7A is arranged on the first waveguide 6A3. The electrode pad 8 that is electrically connected to the first heater electrode 7A includes a first electrode pad 8A3 that is arranged in the vicinity of the first combiner 4 and a second electrode pad 8B3 that is arranged in the vicinity of the first splitter 2.

The second heater electrode 7B is arranged on the fourth waveguide 6D3. The electrode pad 8 that is electrically connected to the second heater electrode 7B includes a third electrode pad 8C3 that is arranged in the vicinity of the second combiner 5 and a fourth electrode pad 8D3 that is arranged in the vicinity of the second splitter 3. The 90-degree hybrid circuit 1E includes wiring 8E3 that electrically connects the second electrode pad 8B3 and the third electrode pad 8C3.

The first combiner 4 inputs the signal light Sig−d+h of 0 degrees received from the first waveguide 6A3 and the local oscillator light LO+d of 0 degrees received from the third waveguide 6C3. The first combiner 4 outputs, on the basis of the input signal light and the input local oscillator light, the first signal light, as the channel CH1, obtained by multiplexing the signal light Sig-d+h and the local oscillator light LO+90+d to the first output port included in the first combiner 4. The first signal light has a phase difference of 0 degrees between the signal light and the local oscillator light, and that has the XIp component.

Furthermore, the first combiner 4 outputs, on the basis of the input signal light of 0 degrees and the input local oscillator light of 0 degrees, the second signal light, as the channel CH2, obtained by multiplexing the signal light Sig+90−d+h of 90 degrees and the local oscillator light LO+d of 0 degrees to the second output port 41D included in the first combiner 4. The second signal light has a phase difference of 180 degrees between the signal light and the local oscillator light, and that has the XIn component.

The second combiner 5 inputs the signal light Sig+90+d of 90 degrees received from the first splitter 2 and the local oscillator light LO−d of 0 degrees received from the second splitter 3. The second combiner 5 outputs, on the basis of the input signal light of 90 degrees and the input local oscillator light of 0 degrees, the third signal light, as the channel CH3, obtained by multiplexing the signal light Sig+90+d of 90 degrees and the local oscillator light LO+90−d of 90 degrees to the first output port 51C included in the second combiner 5. The third signal light has a phase difference of 90 degrees between the signal light and the local oscillator light, and that has the XQp component.

Furthermore, the second combiner 5 outputs, on the basis of the input signal light of 90 degrees and the input local oscillator light of 0 degrees, the fourth signal light, as the channel CH4, obtained by multiplexing the signal light Sig+180+d of 180 degrees and the local oscillator light LO−d of 0 degrees to the second output port 51D included in the second combiner 5. The fourth signal light has a phase difference of 270 degrees between the signal light and the local oscillator light, and that has the XQn component.

The first heater electrode 7A that is arranged on the first waveguide 6A3 accordingly heats the first waveguide 6A3 as a result of an electric current flowing through a path between the first electrode pad 8A3 and the second electrode pad 8B3. In the first waveguide 6A3, the refractive index is changed in accordance with the thermo-optical effect of the first waveguide 6A3, and the phase angle of the signal light propagating through the first waveguide 6A3 becomes high. The first heater electrode 7A adjusts the signal light Sig−d that enters the first combiner 4 by the phase change h that is indicated when the first waveguide 6A3 is heated. As a result of this, the 90-degree hybrid circuit 1E adjusts the signal light Sig-d+h that enters the first combiner 4 such that the phase difference at the channel CH1 becomes 0 degrees and the phase difference at the channel CH2 becomes 180 degrees. In addition, the interval between the first waveguide 6A3 and the second waveguide 6B3 is made wide, so that heat generated in the first heater electrode 7A arranged on the first waveguide 6A3 does not affect the second waveguide 6B3, and thus, the effect of the phase adjustment is accordingly increased.

The second heater electrode 7B that is arranged on the fourth waveguide 6D3 heats the fourth waveguide 6D3 as a result of an electric current flowing through a path between the third electrode pad 8C3 and the fourth electrode pad 8D3. In the fourth waveguide 6D3, the refractive index is changed in accordance with the thermo-optical effect of the fourth waveguide 6D3, and the phase angle of the signal light propagating through the fourth waveguide 6D3 becomes high. The second heater electrode 7B adjusts the local oscillator light LO−d that enters the second combiner 5 by the phase change h indicated when the fourth waveguide 6D3 is heated. As a result of this, the 90-degree hybrid circuit 1E adjusts the local oscillator light LO−d+h that enters the second combiner 5 such that the phase difference at the channel CH3 becomes 90 degrees and the phase difference at the channel CH4 becomes 270 degrees. In addition, the interval between the third waveguide 6C3 and the fourth waveguide 6D3 is made wide, so that heat generated in the second heater electrode 7B arranged on the fourth waveguide 6D3 does not affect the third waveguide 6C3, and thus, the effect of the phase adjustment is accordingly increased.

In the 90-degree hybrid circuit 1E according to the sixth embodiment, although the optical length L of each of the first waveguide 6A3 and the fourth waveguide 6D3 on which the heater electrode has been arranged is able to be adjusted only in a length direction, the optical length of each of the second waveguide 6B3 and the third waveguide 6C3 on which the heater electrode is not arranged is set to L+dL. As a result of this, the optical length L of each of the first waveguide 6A3 and the fourth waveguide 6D3 on which the heater electrode 7 is arranged is able to be adjusted by heat generated in the heater electrode 7.

The 90-degree hybrid circuit 1E adjusts the phase angle of the signal light by the first heater electrode 7A that is arranged on the first waveguide 6A3 and also adjusts the phase angle of the local oscillator light by the second heater electrode 7B that is arranged on the fourth waveguide 6D3, so that the 90-degree hybrid circuit 1E is able to adjust the phase difference between the signal light and the local oscillator light to 90 degrees. The 90-degree hybrid circuit 1E is able to adjust, by adjusting the phase difference between the signal light and the local oscillator light to 90 degrees at a specific channel, such that the phase of the signal light with respect to the local oscillator light is different by 90 degrees between the channels, for example, between the channel CH1 and the channel CH3. In addition, for example, even in the case where overall adjustment of 10 degrees is performed, it is possible to partially charge driving adjustment of the heater electrode by performing adjustment of 5 degrees at the first heater electrode 7A and by performing adjustment of 5 degrees at the second heater electrode 7B.

By the way, in the 90-degree hybrid circuit 1E according to the sixth embodiment, a case has been described as an example in which the second splitter 3 is constituted by a 1×2 coupler, but the second splitter 3 may be constituted by a 2×2 coupler, and an embodiment thereof will be described below as a seventh embodiment.

(g) Seventh Embodiment

Figure 7:
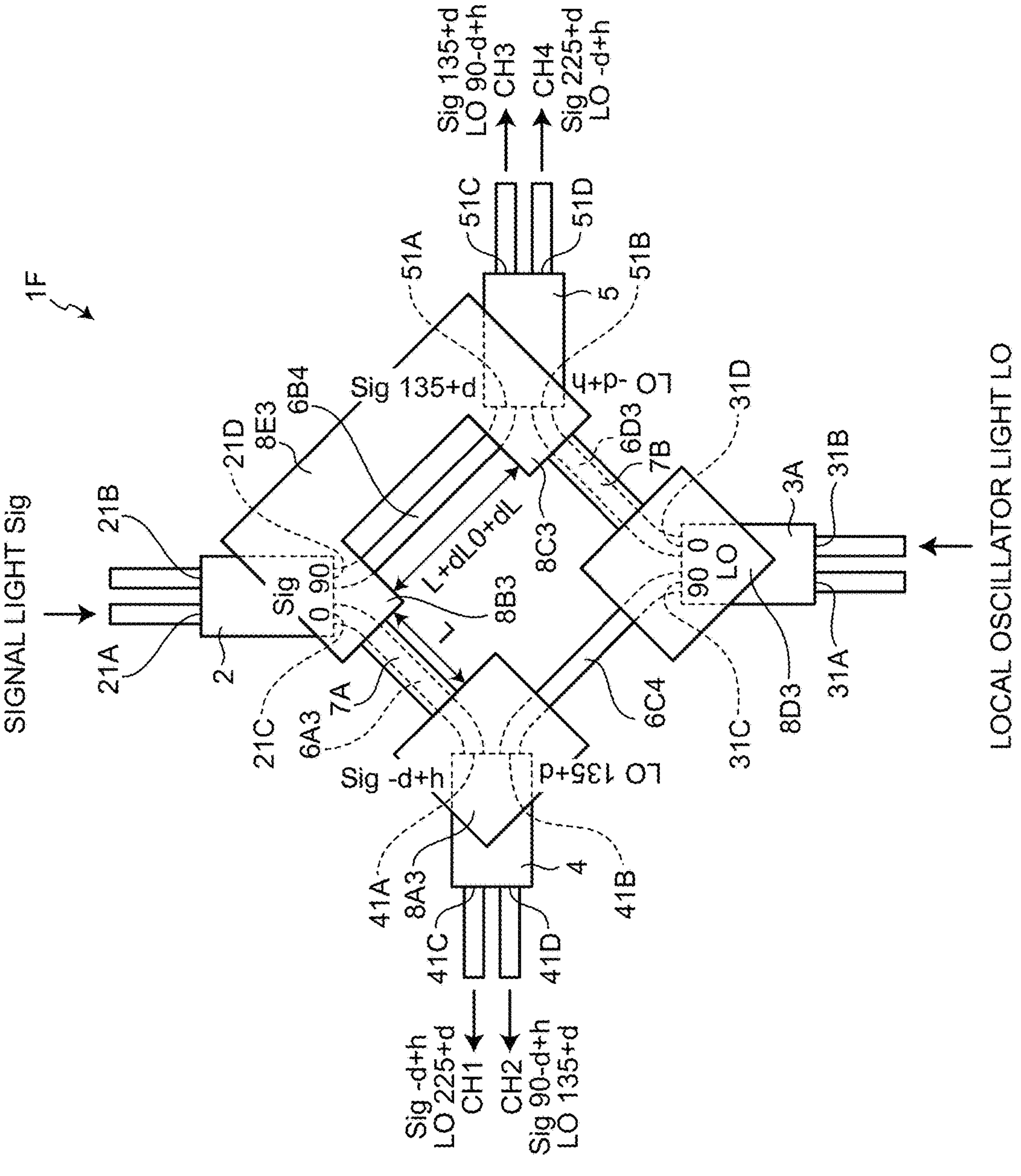
FIG. 7 is an explanation diagram illustrating one example of a 90-degree hybrid circuit according to a seventh embodiment.

FIG. 7 is an explanation diagram illustrating one example of a 90-degree hybrid circuit 1F according to the seventh embodiment. In addition, by assigning the same reference numerals to components having the same configuration as those in the 90-degree hybrid circuit 1E according to the sixth embodiment, overlapped descriptions of the configuration and the operation thereof will be omitted. The 90-degree hybrid circuit 1F according to the seventh embodiment is different from the 90-degree hybrid circuit 1E according to the sixth embodiment in that a second splitter 3A is constituted by a 2×2 coupler.

In the 90-degree hybrid circuit 1F, the first splitter 2 and the second splitter 3A are constituted to have point symmetry, the first waveguide 6A3 and the fourth waveguide 6D3 are constituted to have point symmetry, and a second waveguide 6B4 and a third waveguide 6C4 are constituted to have point symmetry. As a result of this, it is possible to reduce an influence caused by a process error occurring when the 90-degree hybrid circuit 1F is manufactured.

The first splitter 2 optically connects the first output port 21C included in the first splitter 2 and the first input port 41A included in the first combiner 4 by the first waveguide 6A3. The first waveguide 6A3 includes the first input section 12, the first output section 13, and the first straight line waveguide 11 that connects the first input section 12 and the first output section 13. The optical length of the first waveguide 6A3 is set to L.

The first splitter 2 optically connects the second output port 21D included in the first splitter 2 and the second input port 51B included in the second combiner 5 by the second waveguide 6B4. The second waveguide 6B4 includes the second input section 12A, the second output section 13A, and the second straight line waveguide 11A that connects the second input section 12A and the second output section 13A. The optical length of the second waveguide 6B4 is set to L+dL0+dL. Moreover, the optical length dL accordingly generates the input signal light of Sig−d and the input signal light of Sig+135+d, that is, generates "d". The optical length dL0 of the waveguide length is adjusted in advance such that the phase difference is 90 degrees.

The second splitter 3A optically connects the first output port 31C included in the second splitter 3A and the second input port 41B included in the first combiner 4 by the third waveguide 604. The third waveguide 6C4 includes the second input section 12A, the second output section 13A, and the second straight line waveguide 11A that connects the second input section 12A and the second output section 13A. The optical length of the third waveguide 6C4 is set to L+dL0+dL. Moreover, the optical length dL accordingly generates the local oscillator light of Lo+135+d and the local oscillator light of LO−d, that is, generates "d". The optical length dL0 adjusts the waveguide length such that the phase difference is 90 degrees.

The second splitter 3A optically connects the second output port 31D included in the second splitter 3A and the second input port 51B included in the second combiner 5 by the fourth waveguide 6D3. The fourth waveguide 6D3 includes the first input section 12, the first output section 13, and the first straight line waveguide 11 that connects the first input section 12 and the first output section 13. The optical length of the fourth waveguide 6D3 is set to L.

In the case where the optical length of the first waveguide 6A3 is denoted by L1, the optical length of the second waveguide 6B4 is denoted by L2, the optical length of the third waveguide 604 is denoted by L3, and the optical length of the fourth waveguide 6D3 is denoted by L4, the relationship of the optical length among the first to the fourth waveguides is $L1+L4<L2+L3$.

The second splitter 3 according to the sixth embodiment is constituted by a 1×2 coupler, so that the phase difference between two outputs becomes 0 degrees, whereas the first splitter 2 is constituted by a 2×2 coupler, so that the phase difference between two outputs becomes 90 degrees. If the waveguide lengths of the waveguides that connect the respective splitters and the combiners are made same and in the case where the heater electrode is not driven, the phase difference between the signal light and the local oscillator light becomes 0 degrees at the time of an input by the first combiner 4 and becomes 90 degrees at the time of an input by the second combiner 5.

In contrast, the first splitter 2 and the second splitter 3A according to the seventh embodiment is constituted by a 2×2 coupler. Therefore, if the waveguide lengths of the waveguides that connect the respective splitters and the combiners are made the same and in the case where the heater electrode is not driven, the phase difference between the signal light and the local oscillator light becomes-90 degrees at the time of an input by the first combiner 4, and becomes +90 degrees at the time of an input by the second combiner 5. As a result of this, the "phase of the signal light with respect to the local oscillator light" is different by 180 degrees between the channels, for example, between the channel CH1 and the channel CH3. In this case, the 90-degree hybrid circuit 1F does not function as 90-degree hybrid. Accordingly, in the configuration illustrated in FIG. 7, in order to set the phase difference 90 degrees by using the waveguide length of the waveguide that connects the combiner and the splitter, an optical length difference of dL0 described above is used. In order to set the phase difference of 90 degrees, dL0 is set to ¼ of the wavelength of light propagating through the waveguide. An optical length difference of dL0=λ/4 is used.

In order to set the phase difference to 90°, the waveguide length of the waveguide is adjusted in advance. In other words, the 90-degree hybrid circuit 1F is constituted such that 2*dL0 becomes ¼ of the wavelength of light in the case where the optical length of each of the first waveguide 6A3 and the fourth waveguide 6D3 is set to L, and the optical length of each of the second waveguide 6B4 and the third waveguide 6C4 is set to L+dL0. In addition, an optical length difference dL considering a variation in phase difference is set, and the phase difference can be adjusted to 90° by driving the heater electrode 7.

The first heater electrode 7A is arranged on the first waveguide 6A3. The electrode pad 8 that is electrically connected to the first heater electrode 7A includes the first electrode pad 8A3 that is arranged in the vicinity of the first combiner 4 and the second electrode pad 8B3 that is arranged in the vicinity of the first splitter 2.

The second heater electrode 7B is arranged on the fourth waveguide 6D3. The electrode pad 8 that is electrically connected to the second heater electrode 7B includes the third electrode pad 8C3 that is arranged in the vicinity of the second combiner 5 and the fourth electrode pad 8D3 that is arranged in the vicinity of the second splitter 3. The 90-degree hybrid circuit 1F includes the wiring 8E3 that electrically connects the second electrode pad 8B3 and the third electrode pad 8C3.

The first combiner 4 inputs the signal light Sig−d+h of 0 degrees received from the first waveguide 6A3 and the local oscillator light LO+135+d of 0 degrees received from the third waveguide 6C3. The first combiner 4 outputs, on the basis of the input signal light and the input local oscillator light, the first signal light, as the channel CH1, obtained by multiplexing the signal light Sig-d+h and the local oscillator light LO+225+d to the first output port 41C included in the first combiner 4. The first signal light has a phase difference of 0 degrees between the signal light and the local oscillator light, and that has the XIp component.

The first combiner 4 outputs, on the basis of the input signal light of 0 degrees and the local oscillator light of 0 degrees, the second signal light, as the channel CH2, obtained by multiplexing the signal light Sig+90−d+h of 90 degrees and local oscillator light LO+135+d of 0 degrees to the second output port 41D included in the first combiner 4. The second signal light has a phase difference of 180 degrees between the signal light and the local oscillator light, and that has the XIn component.

The second combiner 5 inputs the signal light Sig+135+d of 90 degrees received from the first splitter 2 and the local oscillator light LO−d of 0 degrees received from the second splitter 3A. The second combiner 5 outputs, on the basis of the input signal light of 90 degrees and the input local oscillator light of 0 degrees, the third signal light, as the channel CH3, obtained by multiplexing the signal light Sig+135+d of 90 degrees and the local oscillator light LO+90−d+h of 90 degrees to the first output port 51C included in the second combiner 5. The third signal light has a phase difference of 90 degrees between the signal light and the local oscillator light, and that has the XQp component.

The second combiner 5 outputs, on the basis of the input signal light of 90 degrees and the local oscillator light of 0 degrees, the fourth signal light, as the channel CH4, obtained by multiplexing the signal light Sig+225+d of 180 degrees and the local oscillator light LO−d+h of 0 degrees to the second output port 51D included in the second combiner 5. The fourth signal light has a phase difference of 270 degrees between the signal light and the local oscillator light, and that has the XQn component. The first heater electrode 7A that is arranged on the first waveguide 6A3 accordingly heats the first waveguide 6A3 as a result of an electric current flowing through a path between the first electrode pad 8A3 and the second electrode pad 8B3. In the first waveguide 6A3, the refractive index is changed in accordance with the thermo-optical effect of the first waveguide 6A3, and the phase angle of the signal light propagating through the first waveguide 6A3 becomes high. The first heater electrode 7A adjusts the signal light Sig−d that enters the first combiner 4 by the phase change h indicated when the first waveguide 6A3 is heated. As a result of this, the 90-degree hybrid circuit 1F adjusts the signal light Sig-d+h that enters the first combiner 4 such that the phase difference at the channel CH1 becomes 0 degrees and the phase difference at the channel CH2 becomes 180 degrees. In addition, the interval between the first waveguide 6A3 and the second waveguide 6B4 is made wide, so that the heat generated in the first heater electrode 7A arranged on the first waveguide 6A3 does not affect the second waveguide 6B4, and thus, the effect of the phase adjustment is accordingly increased.

The second heater electrode 7B that is arranged on the fourth waveguide 6D3 heats the fourth waveguide 6D3 as a result of an electric current flowing through a path between the third electrode pad 8C3 and the fourth electrode pad 8D3. In the fourth waveguide 6D3, the refractive index is changed in accordance with the thermo-optical effect of the fourth waveguide 6D3, and the phase angle of the signal light propagating through the fourth waveguide 6D3 becomes high. The second heater electrode 7B adjusts the local oscillator light LO−d that enters the second combiner 5 by the phase change h that is indicated when the fourth waveguide 6D3 is heated. As a result of this, the 90-degree hybrid circuit 1F adjusts the local oscillator light LO−d+h that enters the second combiner 5 such that the phase difference at the channel CH3 becomes 90 degrees and the phase difference at the channel CH4 becomes 270 degrees. In addition, the interval between the third waveguide 6C4 and the fourth waveguide 6D3 is made wide, so that the heat generated in the second heater electrode 7B arranged on the fourth waveguide 6D3 does not affect the third waveguide 6C4, and thus, the effect of the phase adjustment is accordingly increased.

The 90-degree hybrid circuit 1F allows the state of the relationship to enter L1+L4=L2+L3+λ/4 by increasing L1 and L4 by driving the first heater electrode 7A and the second heater electrode 7B while setting the state of the relationship to L1+L4<L2+L3+λ/4. As a result of this, it is possible to adjust the phase difference between the signal light and the local oscillator light to 90 degrees.

The 90-degree hybrid circuit 1F according to the seventh embodiment allows the state of the relationship to enter L1+L4=L2+L3+λ/4 by increasing L1 and L4 by driving the first heater electrode 7A and the second heater electrode 7B while setting the state of the relationship to L1+L4<L2+L3+λ/4. As a result of this, even if each of the first splitter 2 and the second splitter 3A is constituted by a 2×2 coupler, it is possible to adjust the phase difference between the signal light and the local oscillator light to 90 degrees by adjusting the refractive index of each of the first waveguide 6A3 and the fourth waveguide 6D3.

In addition, the 90-degree hybrid circuit 1F has been constituted such that the relationship of L1+L4=L2+L3+λ/4 is obtained by increasing L1 and L4 by driving the heater electrode 7 using the optical length difference of dL0=λ/4 indicating that the phase difference of 90 degrees is allowed to be set by the waveguide length pf the waveguide disposed between the combiner and the splitter. However, the embodiment is not limited to this, and an embodiment thereof will be described below as an eighth embodiment.

(h) Eighth Embodiment

Figure 8:
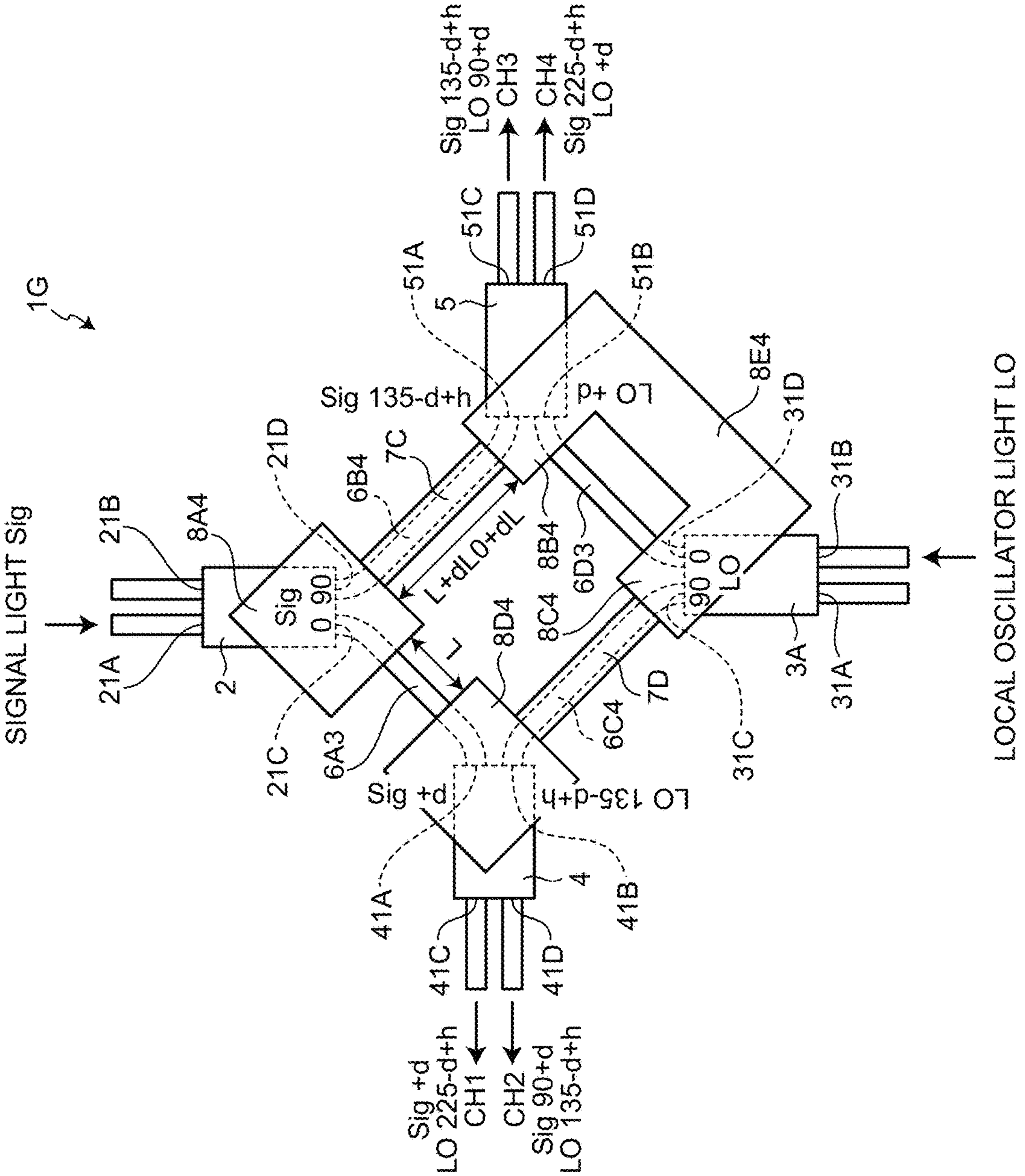
FIG. 8 is an explanation diagram illustrating one example of a 90-degree hybrid circuit according to an eighth embodiment.

FIG. 8 is an explanation diagram illustrating one example of a 90-degree hybrid circuit 1G according to the eighth embodiment. In addition, by assigning the same reference numerals to components having the same configuration as those in the 90-degree hybrid circuit 1F according to the seventh embodiment, overlapped descriptions of the configuration and the operation thereof will be omitted. The 90-degree hybrid circuit 1G according to the eighth embodiment is different from the 90-degree hybrid circuit 1F according to the seventh embodiment in that the phase difference is adjusted to 90 degrees by increasing the optical lengths of L2 and L3 in the heater electrode 7 to obtain the relationship of L1+L4=L2+L3+λ/4.

In the 90-degree hybrid circuit 1G, the first splitter 2 and the second splitter 3A are constituted to have point symmetry, the first waveguide 6A3 and the fourth waveguide 6D3 are constituted to have point symmetry, and the second waveguide 6B3 and the third waveguide 6C3 are constituted to have point symmetry. As a result of this, it is possible to reduce an influence caused by a process error occurring when the 90-degree hybrid circuit 1G is manufactured.

The first splitter 2 optically connects the first output port 21C included in the first splitter 2 and the first input port 41A included in the first combiner 4 by the first waveguide 6A3. The first waveguide 6A3 includes the first input section 12, the first output section 13, and the first straight line waveguide 11 that connects the first input section 12 and the first output section 13. The optical length of the first waveguide 6A3 is set to L.

The first splitter 2 optically connects the second output port 21D included in the first splitter 2 and the first input port 51A included in the second combiner 5 by the second waveguide 6B4. The second waveguide 6B4 includes the second input section 12A, the second output section 13A, and the second straight line waveguide 11A that connects the second input section 12A and the second output section 13A. The optical length of the second straight line waveguide 11A is set to L+dL0−dL. In addition, the optical length dL generates the signal light of Sig+d and the signal light of Sig+135-d, that is, generates "d". The optical length dL0 is constituted such that the phase difference is 90 degrees by adjusting the waveguide length in advance.

The second splitter 3A optically connects the first output port 31C included in the second splitter 3A and the second input port 41B included in the first combiner 4 by the third waveguide 6C4. The third waveguide 6C4 includes the second input section 12A, the second output section 13A, and the second straight line waveguide 11A that connects the second input section 12A and the second output section 13A. The optical length of the third waveguide 6C4 is set to L+dL0−dL. In addition, the optical length dL accordingly generates the local oscillator light of LO+135−d and the local oscillator light of LO+d, that is, generates "d". The optical length dL0 of the waveguide length is adjusted in advance such that the phase difference is 90 degrees.

The second splitter 3A optically connects the second output port 31D included in the second splitter 3A and the second input port 51B included in the second combiner 5 by the fourth waveguide 6D3. The fourth waveguide 6D3 includes the first input section 12, the first output section 13, and the first straight line waveguide 11 that connects the first input section 12 and the first output section 13. The optical length of a fourth waveguide 6D4 is set to L.

In the case where the optical length of the first waveguide 6A3 is denoted by L1, optical length of the second waveguide 6B4 is denoted by L2, the optical length of the third waveguide 604 is denoted by L3, and the optical length of the fourth waveguide 6D3 is denoted by L4, the relationship of the optical length among the first to the fourth waveguides 6A3 to 6D3 is L1+L4<L2+L3. The first splitter 2 and the second splitter 3A according to the eighth embodiment is constituted by a 2×2 coupler. Therefore, if the waveguide lengths of the waveguides that connect the respective splitters and the combiners are made the same and in the case where the heater electrode is not driven, the phase difference between the signal light and the local oscillator light becomes −90 degrees at the time of an input by the first combiner 4, and becomes+90 degrees at the time of an input by the second combiner 5. As a result of this, the "phase of the signal light with respect to the local oscillator light" is different by 180 degrees between the channels, for example, between the channel CH2 and the channel CH4. In this case, the 90-degree hybrid circuit 1G does not function as 90-degree hybrid. Accordingly, in the configuration illustrated in FIG. 8, in order to set the phase difference 90 degrees by using the waveguide length of the waveguide that connects the combiner and the splitter, an optical length difference of dL0 is used. In order to set the phase difference of 90 degrees, dL0 is set to ¼ of the wavelength.

In order to set the phase difference to 90°, the waveguide length of the waveguide is adjusted in advance. In other words, the 90-degree hybrid circuit 1G is constituted such that 2*dL0 becomes ¼ of the wavelength of light in the case where the optical length of each of the first waveguide 6A3 and the fourth waveguide 6D3 is set to L, and the optical length of each of the second waveguide 6B4 and the third waveguide 604 is set to L+dL0. In addition, an optical length difference dL considering a variation in phase difference is set, and the phase difference can be adjusted to 90° by driving the heater electrode 7.

A third heater electrode 7C is arranged on the second waveguide 6B4. The electrode pad 8 that is electrically connected to the third heater electrode 7C includes a first electrode pad 8A4 that is arranged in the vicinity of the first splitter 2 and a second electrode pad 8B4 that is arranged in the vicinity of the second combiner 5.

A fourth heater electrode 7D is arranged on the third waveguide 6C4. The electrode pad 8 that is electrically connected to the fourth heater electrode 7D includes a third electrode pad 8C4 that is arranged in the vicinity of the second splitter 3A and a fourth electrode pad 8D4 that is arranged in the vicinity of the first combiner 4. The 90-degree hybrid circuit 1G includes wiring 8E4 that electrically connects the second electrode pad 8B4 and the third electrode pad 8C4.

The first combiner 4 inputs the signal light Sig+d of 0 degrees received from the first waveguide 6A3 and the local oscillator light LO+135−d+h of 0 degrees received from the third waveguide 6C3. The first combiner 4 outputs, on the basis of the input signal light and the input local oscillator light, the first signal light, as the channel CH1, obtained by multiplexing the signal light Sig+d and the local oscillator light LO+225−d+h to the first output port 41C included in the first combiner 4. The first signal light has a phase difference of 0 degrees between the signal light and the local oscillator light, and that has the XIp component.

The first combiner 4 outputs, on the basis of the input signal light of 0 degrees and the input local oscillator light of 0 degrees, the second signal light, as the channel CH2, obtained by multiplexing the signal light Sig+90+d of 90 degrees and the local oscillator light LO+135−d+h of 0 degrees to the second output port 41D included in the first combiner 4. The second signal light has a phase difference of 180 degrees between the signal light and the local oscillator light, and that has the XIn component.

The second combiner 5 inputs the signal light Sig+135−d+h of 90 degrees received from the first splitter 2 and the local oscillator light LO+d of 0 degrees received from the second splitter 3A. The second combiner 5 outputs, on the basis of the signal light of 90 degrees and the input local oscillator light of 0 degrees, the third signal light, as the channel CH3, obtained by multiplexing signal light Sig+135−d+h of 90 degrees and the local oscillator light LO+90+d of 90 degrees to the first output port 51C included in the second combiner 5. The third signal light has a phase difference of 90 degrees between the signal light and the local oscillator light, and that has the XQp component.

The second combiner 5 outputs, on the basis of the input signal light of 90 degrees and the local oscillator light of 0 degrees, the fourth signal light, as the channel CH4, obtained by multiplexing the signal light Sig+225−d+h of 180 degrees and local oscillator light LO+d of 0 degrees to the second output port 51D included in the second combiner 5. The fourth signal light has a phase difference of 270 degrees between the signal light and the local oscillator light, and that has the XQn component.

The third heater electrode 7C that is arranged on the second waveguide 6B4 heats the second waveguide 6B4 as a result of an electric current flowing through a path between the first electrode pad 8A4 and the second electrode pad 8B4. In the second waveguide 6B4, the refractive index is changed in accordance with the thermo-optical effect of the second waveguide 6B4, and the phase angle of the signal light propagating through the second waveguide 6B4 becomes high. The third heater electrode 7C adjusts the signal light Sig+135−d that enters the second combiner 5 by the phase change h that is indicated when the second waveguide 6B4 is heated. As a result of this, the 90-degree hybrid circuit 1G adjusts the signal light Sig+135−d+h that enters the second combiner 5 such that the phase difference at the channel CH3 becomes 90 degrees and the phase difference at the channel CH4 becomes 270 degrees.

the fourth heater electrode 7D that is arranged on the third waveguide 6C4 heats the third waveguide 6C4 as a result of an electric current flowing through a path between the third electrode pad 804 and the fourth electrode pad 8D4. In the third waveguide 6C4, the refractive index is changed in accordance with the thermo-optical effect of the third waveguide 6C4, and the phase angle of the signal light propagating through the third waveguide 6C4 becomes high. The fourth heater electrode 7D adjusts the local oscillator light LO+135−d that enters the first combiner 4 by the phase change h that is indicated when the third waveguide 6C4 is heated. As a result of this, the 90-degree hybrid circuit 1G adjusts the local oscillator light LO+135−d+h that enters the first combiner 4 such that the phase difference at the channel CH1 is 0 degrees and the phase difference at the channel CH2 is 180 degrees.

90-degree hybrid circuit 1G allows the state of the relationship to enter L1+L4=L2+L3+λ/4 by increasing L2 and L3 by driving the third heater electrode 7C and the fourth heater electrode 7D while setting the state of the relationship to L1+L4>L2+L3+λ/4. As a result of this, it is possible to adjust the phase difference between the signal light and the local oscillator light to 90 degrees.

The 90-degree hybrid circuit 1G according to the eighth embodiment allows the state of the relationship to enter L1+L4=L2+L3+λ/4 by increasing L2 and L3 by driving the third heater electrode 7C and the fourth heater electrode 7D while setting the state of the relationship to L1+L4>L2+L3+λ/4. As a result of this, even if each of the first splitter 2 and the second splitter 3A is constituted by a 2×2 coupler, it is possible to adjust the phase difference between the signal light and the local oscillator light to 90 degrees by adjusting the refractive index of each of the second waveguide 6B4 and the third waveguide 6C4.

In the present embodiment, a case has been described as an example of the phase adjustment portion that adjusts the phase angle of the signal light or the local oscillator light by adjusting the refractive index of the waveguide by driving the heater electrode 7. However, the phase adjustment portion is not limited to the thermo-optical effect exhibited by the heater electrode 7, the phase angle of the signal light or the local oscillator light may be adjusted by using a material having the electro-optical effect as a waveguide, and adjusting the refractive index by injecting an electric current to the waveguide, and appropriate modifications are possible.

The first to the fourth waveguides 6A to 6D may be, for example, a channel waveguide, a rib waveguide, a ridge waveguide, a slab waveguide, or the like, and appropriate modifications are possible.

Figure 9:
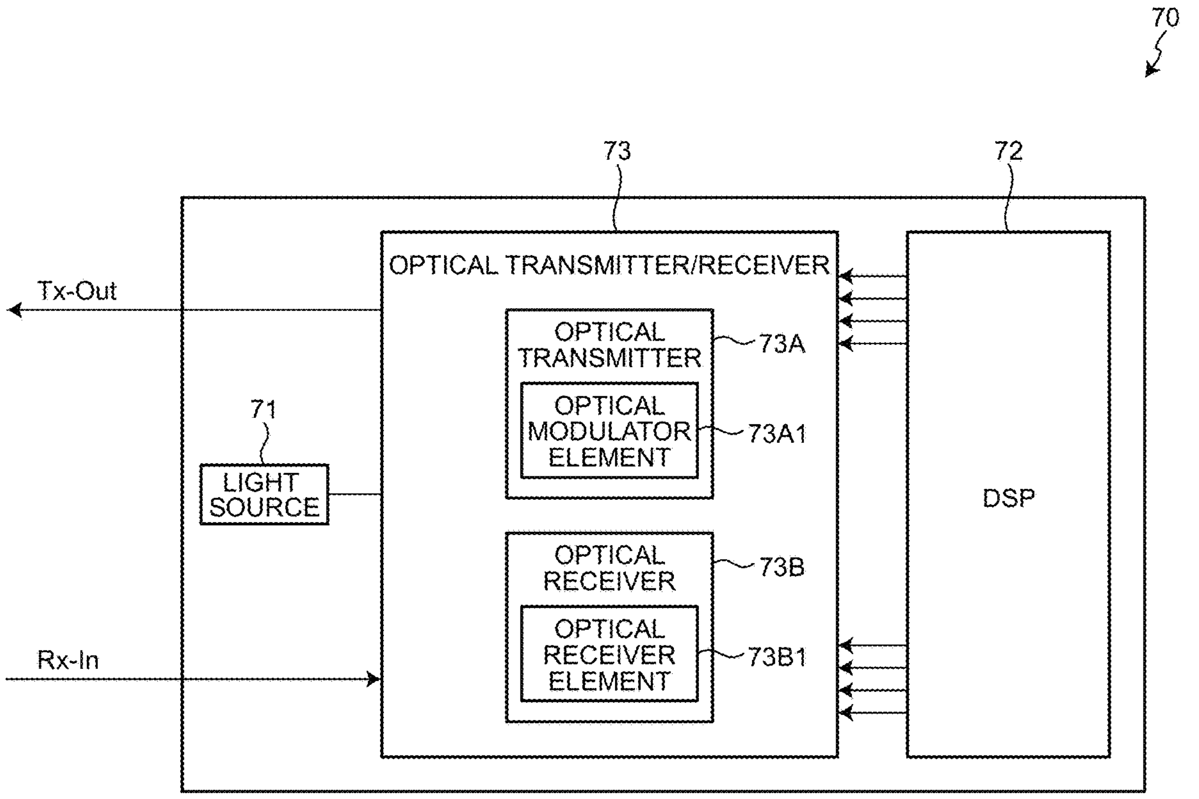
FIG. 9 is an explanation diagram illustrating one example of an optical transceiver according to the present embodiment.
Figure 10:
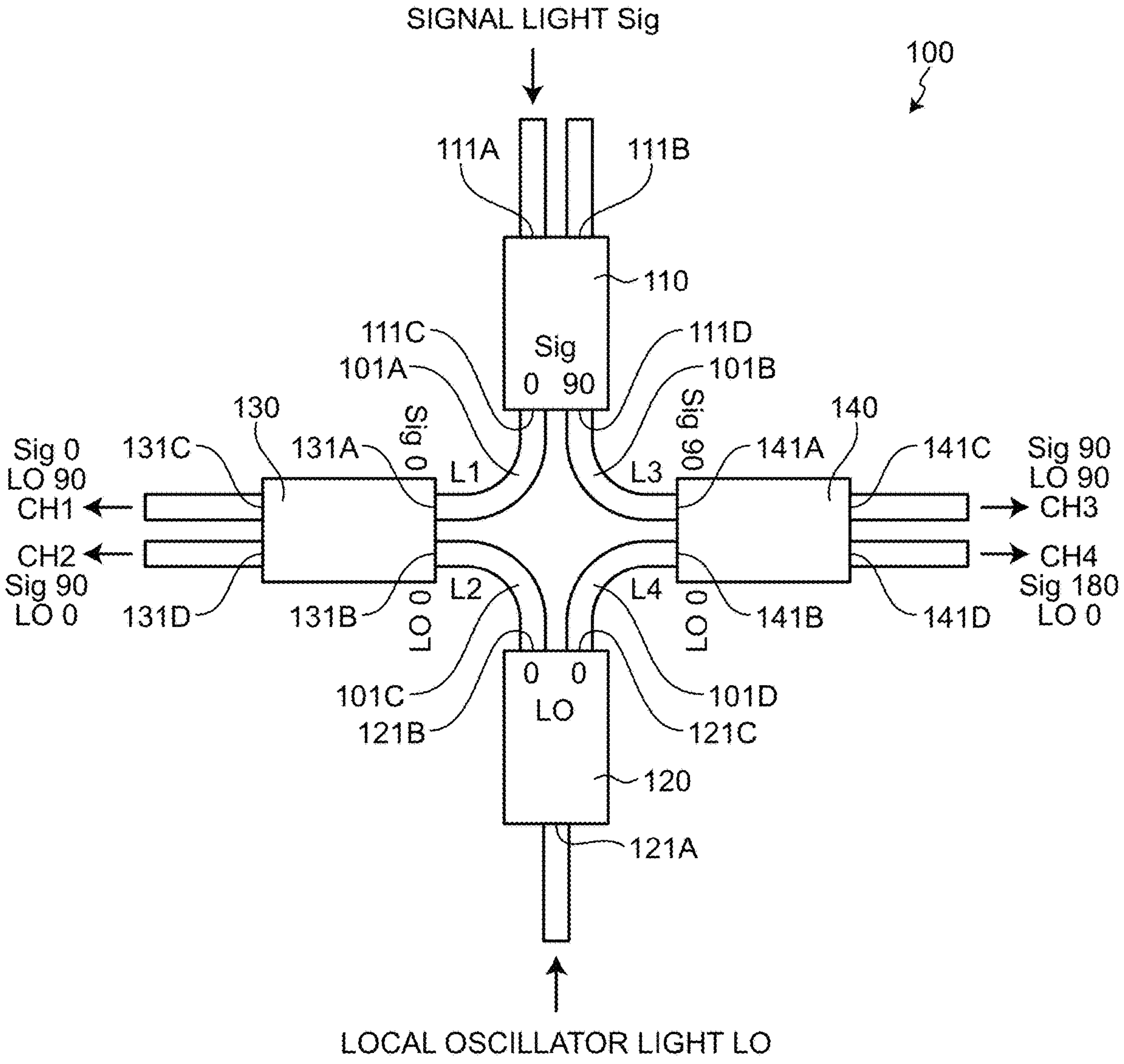
RELATED ART FIG.10
FIG. 10 is an explanation diagram illustrating one example of a 90-degree hybrid circuit that is conventionally used.

FIG. 9 is an explanation diagram illustrating one example of an optical transceiver 70 according to the present embodiment. The optical transceiver 70 illustrated in FIG. 9 is connected to an optical fiber disposed on an output side and an optical fiber disposed on an input side. The optical transceiver 70 includes a light source 71, a digital signal processor (DSP) 72, and an optical transmitter/receiver 73. The optical transmitter/receiver 73 includes an optical transmitter 73A and an optical receiver 73B. The DSP 72 is an electrical component that performs digital signal processing. The DSP 72 performs a process of, for example, encoding transmission data or the like, generating an electrical signal including the transmission data, and outputs the generated electrical signal to the optical transmitter 73A. Furthermore, the DSP 72 acquires an electrical signal including received data from the optical receiver 73B and obtains received data by performing a process of, for example, decoding the acquired electrical signal.

The light source 71 includes, for example, a laser diode or the like, generates light with a predetermined wavelength, and supplies the generated light to the optical transmitter 73A and the optical receiver 73B. The optical transmitter 73A modulates, by using the electrical signal output from the DSP 72, the light supplied from the light source 71, and outputs the obtained transmission light to the optical fiber. The optical transmitter 73A includes an optical modulator element 73A1 that generates the transmission light by modulating, when the light supplied from the light source 71 propagates through the waveguide, the light by using the electrical signal that is input to the optical modulator.

The optical receiver 73B includes an optical receiver element 73B1 that receives the optical signal from the optical fiber and that demodulates the received light by using the light that is supplied from the light source 71. Then, the optical receiver 73B converts the demodulated received light to an electrical signal and outputs the converted electrical signal to the DSP 72. The optical receiver element 73B1 includes, for example, an optical device, such as a 90-degree hybrid circuit, as a built-in unit.

The optical device included in the optical transceiver 70 includes a 90-degree hybrid circuit that combines the signal light and the local oscillator light, and that outputs the signal light by splitting the signal light into orthogonal components. The 90-degree hybrid circuit includes the first coupler that splits the signal light, and the second coupler that splits the local oscillator light. The 90-degree hybrid circuit includes the first waveguide and the second waveguide in each of which the signal light that has been split by the first coupler propagates, and the third waveguide and the fourth waveguide in each of which the local oscillator light that has been split by the second coupler propagates. The 90-degree hybrid circuit includes the third coupler that multiplexes the signal light that has propagated through the first waveguide and the local oscillator light that has propagated through the third waveguide, and the fourth coupler that multiplexes the signal light that has propagated through the second waveguide and the local oscillator light that has propagated through the fourth waveguide. The 90-degree hybrid circuit includes the phase adjustment portion that adjusts the phase of light propagating through at least one waveguide from among the first to the fourth waveguides. The total value of the optical length of the first waveguide and the optical length of the fourth waveguide is shorter than the total value of the optical length of the second waveguide and the optical length of the third waveguide. As a result of this, it is possible to suppress a signal loss.

In addition, for convenience of description, it has been described as an example in which the optical transceiver 70 includes the optical transmitter 73A and the optical receiver 73B as built-in units, but the optical transceiver 70 may include one of the optical transmitter 73A and the optical receiver 73B as a built-in unit. For example, it may be possible to apply an optical device to the optical transceiver 70 that includes the optical receiver 73B as a built-in unit, and appropriate modifications are possible.

Each of the components in the units illustrated in the drawings is not always physically configured as illustrated in the drawings. In other words, the specific shape of a separate or integrated unit is not limited to the drawings; however, all or part of the unit can be configured by functionally or physically separating or integrating any of the units depending on various kinds of loads or use conditions.

Furthermore, all or any part of various processing functions performed by each unit may also be executed by a central processing unit (CPU) (or, a microcomputer, such as a micro processing unit (MPU) or a micro controller unit (MCU)). In addition, all or any part of various processing functions may also be, of course, executed by programs analyzed and executed by the CPU (or the microcomputer, such as the MPU or the MCU), or executed by hardware by wired logic.

According to an aspect of an embodiment, it is possible to suppress a signal loss.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising a 90-degree hybrid circuit that combines signal light and local oscillator light, and that outputs the signal light by splitting the signal light into orthogonal components, wherein the 90-degree hybrid circuit includes a first coupler that splits the signal light, a second coupler that splits the local oscillator light, a first waveguide and a second waveguide in each of which the signal light that has been split by the first coupler propagates, a third waveguide and a fourth waveguide in each of which the local oscillator light that has been split by the second coupler propagates, a third coupler that multiplexes the signal light that has propagated through the first waveguide and the local oscillator light that has propagated through the third waveguide, a fourth coupler that multiplexes the signal light that has propagated through the second waveguide and the local oscillator light that has propagated through the fourth waveguide, wherein a first total value of an optical length of the first waveguide and an optical length of the fourth waveguide is shorter than a second total value of an optical length of the second waveguide and an optical length of the third waveguide, and a phase adjustor that adjusts a phase of the light propagating through at least one waveguide from among the first waveguide, the second waveguide, the third waveguide, and the fourth waveguide, so as to reduce the difference between the first total value and the second total value.

2. The optical device according to claim 1, wherein the phase adjustor is arranged on at least one waveguide between the first waveguide and the fourth waveguide, arranged on the first waveguide in order to adjust a phase angle of the signal light propagating through the first waveguide, and/or arranged on the fourth waveguide in order to adjust a phase angle of the local oscillator light propagating through the fourth waveguide.

3. The optical device according to claim 1, wherein the first total value is shorter than a third total value that corresponds to a total of the second total value and ¼ of a wavelength of the signal light, and the phase adjustor is arranged on at least one waveguide between the first waveguide and the fourth waveguide, arranged on the first waveguide in order to adjust a phase angle of the signal light propagating through the first waveguide such that the first total value and the third total value are the same, and/or arranged on the fourth waveguide in order to adjust a phase angle of the local oscillator light propagating through the fourth waveguide.

4. The optical device according to claim 1, wherein a waveguide width of each of the first waveguide and the fourth waveguide is constituted such that the first total value of the optical length of the first waveguide and the optical length of the fourth waveguide is shorter than the second total value of the optical length of the second waveguide and the optical length of the third waveguide by narrowing the waveguide width of each of the third waveguide and the second waveguide.

5. The optical device according to claim 1, wherein
the optical length of the first waveguide is made the same as the optical length of the fourth waveguide, and
the optical length of the second waveguide is made the same as the optical length of the third waveguide.

6. The optical device according to claim 1, wherein
the phase adjustor includes
a first phase adjustor that is arranged on the first waveguide and that adjusts a phase angle of the signal light propagating through the first waveguide,
a second phase adjustor that is arranged on the fourth waveguide and that adjusts a phase angle of the local oscillator light propagating through the fourth waveguide, and
wiring that electrically connects the first phase adjustor and the second phase adjustor.

7. The optical device according to claim 1, wherein the optical device is constituted to have a structure in which an interval between the first waveguide and the second waveguide is made wider as the first waveguide and the second waveguide are away from a connecting portion of the first waveguide and a connecting portion of the second waveguide, respectively, such that a direction of the signal light propagating at the connecting portion of the first waveguide that is connected to the first coupler is different from a direction of the signal light propagating at the connecting portion of the second waveguide that is connected to the first coupler.

8. The optical device according to claim 1, wherein
the first total value is longer than a third total value that corresponds to a total of the second total value and ¼ of a wavelength of the signal light, and
the phase adjustor is
arranged on at least one waveguide between the second waveguide and the third waveguide,
arranged on the second waveguide in order to adjust a phase angle of the signal light propagating through the second waveguide such that the first total value and the third total value are the same, and/or
arranged on the third waveguide in order to adjust a phase angle of the local oscillator light propagating through the third waveguide.

9. An optical receiver comprising an optical receiver element that converts received signal light to an electrical signal, wherein
the optical receiver element includes an optical device that includes a 90-degree hybrid circuit that combines the signal light and local oscillator light, and that outputs the signal light by splitting the signal light into orthogonal components,
the 90-degree hybrid circuit includes
a first coupler that splits the signal light,
a second coupler that splits the local oscillator light,
a first waveguide and a second waveguide in each of which the signal light that has been split by the first coupler propagates,
a third waveguide and a fourth waveguide in each of which the local oscillator light that has been split by the second coupler propagates,
a third coupler that multiplexes the signal light that has propagated through the first waveguide and the local oscillator light that has propagated through the third waveguide,
a fourth coupler that multiplexes the signal light that has propagated through the second waveguide and the local oscillator light that has propagated through the fourth waveguide,
wherein a first total value of an optical length of the first waveguide and an optical length of the fourth waveguide is shorter than a second total value of an optical length of the second waveguide and an optical length of the third waveguide, and
a phase adjustor that adjusts a phase of the light propagating through at least one waveguide from among the first waveguide, the second waveguide, the third waveguide, and the fourth waveguide, so as to reduce the difference between the first total value and the second total value.

10. An optical transceiver comprising:
an optical modulator element that modulates light that propagates in accordance with an electrical signal;
an optical receiver element that converts received reception light to the electrical signal; and
a signal processing unit that generates the electrical signal to be sent to the optical modulator element, and that acquires the electrical signal sent from the optical receiver element, wherein
the optical receiver element includes an optical device that includes a 90-degree hybrid circuit that combines signal light and local oscillator light, and that outputs the signal light by splitting the signal light into orthogonal components, wherein
the 90-degree hybrid circuit includes
a first coupler that splits the signal light,
a second coupler that splits the local oscillator light,
a first waveguide and a second waveguide in each of which the signal light that has been split by the first coupler propagates,
a third waveguide and a fourth waveguide in each of which the local oscillator light that has been split by the second coupler propagates,
a third coupler that multiplexes the signal light that has propagated through the first waveguide and the local oscillator light that has propagated through the third waveguide,
a fourth coupler that multiplexes the signal light that has propagated through the second waveguide and the local oscillator light that has propagated through the fourth waveguide,
wherein a first total value of an optical length of the first waveguide and an optical length of the fourth waveguide is shorter than a second total value of an optical length of the second waveguide and an optical length of the third waveguide, and
a phase adjustor that adjusts a phase of the light propagating through at least one waveguide from among the first waveguide, the second waveguide, the third waveguide, and the fourth waveguide, so as to reduce the difference between the first total value and the second total value.

* * * * *